United States Patent
Yamamoto et al.

(10) Patent No.: US 11,735,766 B2
(45) Date of Patent: Aug. 22, 2023

(54) SOLID ELECTROLYTE, METHOD FOR PRODUCING SOLID ELECTROLYTE, AND COMPOSITE

(71) Applicant: Seiko Epson Corporation, Tokyo (JP)

(72) Inventors: Hitoshi Yamamoto, Chino (JP); Tsutomu Teraoka, Matsumoto (JP); Tomofumi Yokoyama, Matsumoto (JP)

(73) Assignee: SEIKO EPSON CORPORATION

( * ) Notice: Subject to any disclaimer, the term of this patent is extended or adjusted under 35 U.S.C. 154(b) by 122 days.

(21) Appl. No.: 17/458,988

(22) Filed: Aug. 27, 2021

(65) Prior Publication Data
US 2022/0069345 A1    Mar. 3, 2022

(30) Foreign Application Priority Data

Aug. 28, 2020    (JP) ................................. 2020-144247

(51) Int. Cl.
| | | |
|---|---|---|
| H01M 10/0562 | (2010.01) | |
| H01M 4/36 | (2006.01) | |
| H01M 4/525 | (2010.01) | |
| H01M 4/131 | (2010.01) | |
| H01M 10/0525 | (2010.01) | |

(52) U.S. Cl.
CPC ....... *H01M 10/0562* (2013.01); *H01M 4/131* (2013.01); *H01M 4/366* (2013.01); *H01M 4/525* (2013.01); *H01M 10/0525* (2013.01); *H01M 2300/0068* (2013.01); *H01M 2300/0091* (2013.01)

(58) Field of Classification Search
None
See application file for complete search history.

(56) References Cited

U.S. PATENT DOCUMENTS

| | | | |
|---|---|---|---|
| 2015/0349376 A1* | 12/2015 | Shin .................... | H01M 10/052 |
| | | | 252/62.2 |
| 2019/0097267 A1* | 3/2019 | Yokoyama .............. | H01B 1/08 |

FOREIGN PATENT DOCUMENTS

| | | | | |
|---|---|---|---|---|
| CN | 108727025 A | * | 11/2018 | ............. C04B 35/01 |
| JP | 2009-215130 A | | 9/2009 | |
| JP | 2018037326 A | * | 3/2018 | |
| WO | WO-2017130622 A1 | * | 8/2017 | ............. C01G 33/00 |

OTHER PUBLICATIONS

Machine translation of JP 2018037326A. (Year: 2018).*
Machine translation of CN108727025A. (Year: 2018).*
Rustad, "The Effect of Tetrahedral versus Octahedral Network-Blocking Atom Substitutions on Lithium Ion Conduction in LLZO Garnet", Materials Science, 23 pages, May 27, 2016. (Year: 2016).*

(Continued)

*Primary Examiner* — Gregg Cantelmo
(74) *Attorney, Agent, or Firm* — Harness, Dickey & Pierce, P.L.C.

(57) ABSTRACT

The solid electrolyte according to an embodiment of the present disclosure is represented by the following formula (1):

$$Li_{7-x-y}La_3(Zr_{2-x-y}In_xM_y)O_{12} \qquad (1)$$

wherein $0.00 < x < 0.20$, $0.20 \leq y < 1.50$, M is two or more elements selected from the group consisting of Nb, Ta, and Sb.

5 Claims, 12 Drawing Sheets

(56) References Cited

OTHER PUBLICATIONS

Rustad, "The Effect of Tetrahedral versus Octahedral Network-Blocking Atom Substitutions on Lithium Ion Conduction in LLZO Garnet", publication date information, one page. (Year: 2016).*

H. Imagawa et al., "Garnet-Type $Li_{6.75}La_3Zr_{1.75}Nb_{0.25}O_{12}$ Synthesized By Coprecipitation Method and Its Lithium Ion Conductivity", Solid State Ionics 262, 2014, pp. 609-612.

* cited by examiner

SOLID ELECTROLYTE, METHOD FOR PRODUCING SOLID ELECTROLYTE, AND COMPOSITE

The present application is based on, and claims priority from JP Application Serial Number 2020-144247, filed Aug. 28, 2020, the disclosure of which is hereby incorporated by reference herein in its entirety.

BACKGROUND

1. Technical Field

The present disclosure relates to a solid electrolyte, a method for producing a solid electrolyte, and a composite.

2. Related Art

Lithium batteries (including primary batteries and secondary batteries) are utilized as power sources for many electrical devices, such as portable information devices. Among lithium batteries, it is conceivable to have an all-solid-state lithium battery using a solid electrolyte for lithium ion conduction between the cathode and the anode as a lithium battery having both high energy density and safety (for example, see JP-A-2009-215130).

A solid electrolyte can conduct lithium ions without the use of an organic electrolyte solution, and the use of a solid electrolyte does not lead to electrolyte solution leakage or volatilization of electrolyte solution caused by heat generated during battery operation. As such, solid electrolytes are gaining attention as a highly safe material.

As a type of solid electrolyte used in such all-solid-state lithium batteries, oxide-based solid electrolytes are widely known for their high lithium ion conductivity, excellent insulating property, and high chemical stability. As a type of such oxides, lithium lanthanum zirconate-based materials have a remarkably high lithium ion conductivity and are expected to have a promising application in batteries.

When such a solid electrolyte is solid electrolyte particles in a particulate form, the solid electrolyte is often molded to a desired shape by compression molding. However, because solid electrolyte particles are extremely hard, contact between the solid electrolyte particles in the resulting molded product tends to be insufficient, which may lead to a high grain boundary resistance and a low lithium ion conductivity.

A known method for reducing grain boundary resistance involves subjecting solid electrolyte particles to compression molding and then sintering the resulting product at an elevated temperature of 1000° C. or higher to fuse the particles together. However, with such a method, the composition tends to change due to high heat, making it difficult to produce a molded body of solid electrolyte having a desired physical property.

As such, there is an attempt to develop a material suitable for sintering at a low temperature by substituting some elements in lithium lanthanum zirconate.

However, a solid electrolyte that can give, at a sufficiently low firing temperature, a molded body of solid electrolyte with a sufficiently low grain boundary resistance has not yet been obtained.

SUMMARY

The present disclosure, developed to address the issue described above, can be realized as the following application examples.

A solid electrolyte according to an application example of the present disclosure is represented by the following formula (1):

$$Li_{7-x-y}La_3(Zr_{2-x-y}In_xM_y)O_{12} \tag{1}$$

wherein $0.00<x<0.20$, $0.20 \leq y<1.50$, M is two or more elements selected from the group consisting of Nb, Ta, and Sb.

A method for producing a solid electrolyte according to an application example of the present disclosure includes:

a mixing step for mixing a plurality of raw materials to obtain a mixture, the plurality of raw materials including a metal element included in the following formula (1), a first heating step for subjecting the mixture to a first heat treatment to form a calcined body, and a second heating step for subjecting the calcined body to a second heat treatment to form a crystalline solid electrolyte represented by the following formula (1):

$$Li_{7-x-y}La_3(Zr_{2-x-y}In_xM_y)O_{12} \tag{1}$$

wherein $0.00<x<0.20$, $0.20 \leq y<1.50$, M is two or more elements selected from the group consisting of Nb, Ta, and Sb.

In addition, a composite according to an application example of the present disclosure includes an active material and a solid electrolyte according to the present disclosure covering a portion of a surface of the active material.

DESCRIPTION OF EXEMPLARY EMBODIMENTS

Figure 1:
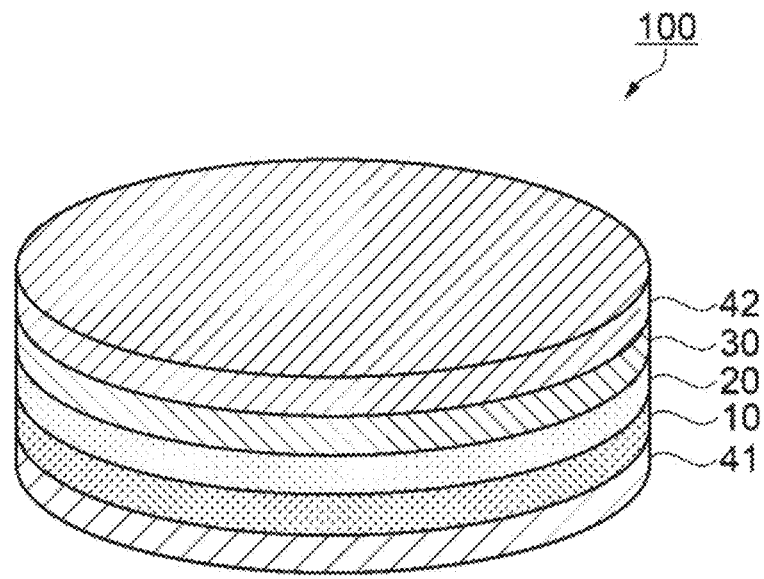
FIG. 1 is a schematic perspective view illustrating a configuration of a lithium ion battery that is a secondary battery according to a first embodiment.

Preferred exemplary embodiments of the present disclosure will be described in detail hereinafter.

1 Solid Electrolyte

First, a solid electrolyte according to an embodiment of the present disclosure will be described.

The solid electrolyte according to an embodiment of the present disclosure is represented by the following formula (1):

$$Li_{7-x-y}La_3(Zr_{2-x-y}In_xM_y)O_{12} \qquad (1)$$

wherein $0.00<x<0.20$, $0.20\leq y<1.50$, M is two or more elements selected from the group consisting of Nb, Ta, and Sb.

By satisfying these conditions, it is possible to provide a solid electrolyte that has excellent bulk lithium ion conductivity and that can give, at a sufficiently low firing temperature, a molded body of solid electrolyte with a sufficiently low grain boundary resistance. In addition, for example, when a known solid electrolyte is co-fired with an active material such as lithium cobalt oxide, interdiffusion occurs among elements, leading to decreased lithium ion conductivity. In comparison, even when the solid electrolyte according to an embodiment of the present disclosure is co-fired with an active material such as lithium cobalt oxide, the occurrence of interdiffusion among elements and the decline in lithium ion conductivity can be effectively suppressed.

Meanwhile, when the conditions described above are not satisfied, excellent effects such as those described above cannot be obtained.

For example, when the solid electrolyte does not include In, it becomes difficult to have a sufficiently excellent bulk lithium ion conductivity and to obtain, at a sufficiently low firing temperature, a molded body of solid electrolyte with a sufficiently low grain boundary resistance, even if the solid electrolyte is made of a lithium lanthanum zirconate-based material including the aforementioned M.

Furthermore, when the content of In in the solid electrolyte is too high, in other words, when the value of the aforementioned x is too large, it becomes difficult to have a sufficiently excellent bulk lithium ion conductivity and to obtain, at a sufficiently low firing temperature, a molded body of solid electrolyte with a sufficiently low grain boundary resistance, even if the solid electrolyte is made of a lithium lanthanum zirconate-based material including In and the aforementioned M.

Furthermore, when the solid electrolyte does not include the aforementioned M, that is, when the solid electrolyte does not include two or more elements selected from the group consisting of Nb, Ta, and Sb, the tetragonal-cubic transition temperature and the melting point can not be sufficiently lowered, the firing temperature can not be lowered, and a high Li conductivity resulted from the high permittivity of oxides of M can not be imparted, even if the solid electrolyte is made of a lithium lanthanum zirconate-based material including In.

In particular, when the solid electrolyte does not include any one of Nb, Ta, and Sb, Li conductivity sufficient for battery driving cannot be obtained.

In addition, when the solid electrolyte includes only one element of Nb, Ta, and Sb but not the other two, Li conductivity sufficient for battery driving cannot be obtained.

Furthermore, when the content of the aforementioned M in the solid electrolyte is too low, in other words, when the value of the aforementioned y is too small, the tetragonal-cubic transition temperature and the melting point can not be sufficiently lowered, the firing temperature can not be lowered, and a high Li conductivity resulted from the high permittivity of oxides of M can not be imparted, even if the solid electrolyte is made of a lithium lanthanum zirconate-based material including In and the aforementioned M.

Furthermore, when the content of M in the solid electrolyte is too high, in other words, when the value of the aforementioned y is too large, it becomes difficult to have a sufficiently excellent bulk lithium ion conductivity and to obtain, at a sufficiently low firing temperature, a molded body of solid electrolyte with a sufficiently low grain boundary resistance, even if the solid electrolyte is made of a lithium lanthanum zirconate-based material including In and the aforementioned M.

As described above, in formula (1) above, x may be any value as long as x satisfies $0.00<x<0.20$, but x preferably satisfies $0.01<x<0.19$, more preferably $0.02<x<0.18$, and even more preferably $0.03<x<0.17$.

Satisfying such a range allows the aforementioned effects to be exhibited more prominently.

As described above, in formula (1) above, y may be any value as long as y satisfies $0.20\leq y<1.50$, but y preferably satisfies $0.30\leq y\leq 1.48$, more preferably $0.40\leq y\leq 1.45$, and even more preferably $0.50\leq y\leq 1.40$.

Satisfying such a range allows the aforementioned effects to be exhibited more prominently.

In the solid electrolyte, Li is mainly present in the C sites and the interstitial sites in the garnet-type lithium ion conductor $Li_7La_3Zr_2O_{12}$, which is the basic skeleton, and contributes to lithium ion conductivity.

In the solid electrolyte, La mainly constitutes the garnet-type lithium ion conductor $Li_7La_3Zr_2O_{12}$, which is the basic skeleton, and occupies the A sites as $La^{3+}$.

In the solid electrolyte, Zr mainly constitutes the garnet-type lithium ion conductor $Li_7La_3Zr_2O_{12}$, which is the basic skeleton, and occupies the B sites as $Zr^{4+}$.

In the solid electrolyte, In mainly has a function of lowering a tetragonal-cubic transition temperature and a melting point compared to the case in which the solid electrolyte does not include In.

In the solid electrolyte, the aforementioned M mainly has a function of lowering the tetragonal-cubic transition temperature and the melting point and of imparting a high Li conductivity, because of the high permittivity of oxides of M, compared to the case in which the solid electrolyte does not include the aforementioned M.

When the aforementioned M includes at least Nb, the tetragonal-cubic transition temperature and the melting point are lowered, and a high Li conductivity can be imparted because of the high permittivity of an oxide of Nb, compared to the case in which the aforementioned M does not include Nb.

Furthermore, when the aforementioned M includes at least Ta, the tetragonal-cubic transition temperature and the melting point are lowered, a high Li conductivity can be imparted because of the high permittivity of an oxide of Ta, and the generation of grain boundaries is more effectively suppressed because an oxide of Ta is crystallization-resistant, compared to the case in which the aforementioned M does not include Ta.

Furthermore, when the aforementioned M includes at least Sb, the tetragonal-cubic transition temperature and the melting point are lowered, and a high Li conductivity can be imparted because of the high permittivity of an oxide of Sb, compared to the case in which the aforementioned M does not include Sb.

In addition, when the aforementioned M includes a combination of Nb and Ta, In is present in a large amount in the crystal bulk, while Nb and Ta are present in a large amount in the grain boundaries. In particular, since an oxide of Ta is crystallization-resistant, the presence of Ta in a large amount in the grain boundaries causes grain boundary amorphization, leading to a state free of grain boundaries, suppressing the generation of lithium dendrites more effectively.

In addition, when the aforementioned M includes a combination of Sb and Ta, In is present in a large amount in the crystal bulk, while Sb and Ta are present in a large amount in the grain boundaries. In particular, since an oxide of Ta is crystallization-resistant, the presence of Ta in a large amount in the grain boundaries causes grain boundary amorphization, leading to a state free of grain boundaries, suppressing the generation of lithium dendrites more effectively.

When the aforementioned M includes at least Nb, a percentage of Nb in the total M is preferably from 20 atomic % to 100 atomic %, more preferably from 40 atomic % to 100 atomic %, and even more preferably from 50 atomic % to 100 atomic %.

By satisfying such a range, the tetragonal-cubic transition temperature and the melting point can be lowered further, and a higher Li conductivity can be imparted because of the high permittivity of an oxide of Nb.

When the aforementioned M includes at least Ta, a percentage of Ta in the total M is preferably from 2 atomic % to 100 atomic %, more preferably from 5 atomic % to 100 atomic %, and even more preferably from 10 atomic % to 100 atomic %.

By satisfying such a range, the tetragonal-cubic transition temperature and the melting point are lowered, a high Li conductivity can be imparted because of the high permittivity of an oxide of Ta, and the generation of grain boundaries is more effectively suppressed because an oxide of Ta is crystallization-resistant.

When the aforementioned M includes at least Sb, a percentage of Sb in the total M is preferably from 20 atomic % to 100 atomic %, more preferably from 40 atomic % to 100 atomic %, and even more preferably from 50 atomic % to 100 atomic %.

By satisfying such a range, the tetragonal-cubic transition temperature and the melting point can be lowered further, and a higher Li conductivity can be imparted because of the high permittivity of an oxide of Sb.

Note that in addition to the elements constituting the aforementioned formula (1), the solid electrolyte according to an embodiment of the present disclosure may include a different element, that is, an element other than Li, La, Zr, In, Nb, Ta, Sb, and O, as long as the different element is included in a trace amount. The different element may be one or two or more.

The content of the different element included in the solid electrolyte according to an embodiment of the present disclosure is preferably 100 ppm or less, more preferably 50 ppm or less.

When two or more elements are included as the different element, the sum of the contents of these elements is used as the content of the different element described above.

The crystal phase of the solid electrolyte according to an embodiment of the present disclosure is typically a cubic garnet-type crystal.

The solid electrolyte according to an embodiment of the present disclosure may be used alone, or may be used in combination with another component. More specifically, the solid electrolyte according to an embodiment of the present disclosure may be used, for example, alone in a battery while constituting a solid electrolyte layer as described below, or may constitute a solid electrolyte layer in a mixed state with another solid electrolyte. Furthermore, the solid electrolyte according to an embodiment of the present disclosure may, for example, constitute a cathode layer in a mixed state with a cathode active material, or may constitute an anode layer in a mixed state with an anode active material.

2 Method for Producing Solid Electrolyte

Next, a method for producing a solid electrolyte according to an embodiment of the present disclosure will be described.

A method for producing a solid electrolyte according to an embodiment of the present disclosure includes:

a mixing step for mixing a plurality of raw materials to obtain a mixture, the plurality of raw materials including a metal element included in the aforementioned formula (1), a first heating step for subjecting the mixture to a first heat treatment to form a calcined body, and a second heating step for subjecting the calcined body to a second heat treatment to form a crystalline solid electrolyte represented by the aforementioned formula (1).

By this method, it is possible to provide a method for producing a solid electrolyte that has excellent bulk lithium ion conductivity and that can, at a sufficiently low firing temperature, give a molded body of solid electrolyte with a sufficiently low grain boundary resistance. In addition, for example, when a known solid electrolyte is co-fired with an active material such as lithium cobalt oxide, interdiffusion occurs among elements, leading to decreased lithium ion conductivity. In comparison, even when the method for producing a solid electrolyte according to an embodiment of the present disclosure is used in co-firing with an active material such as lithium cobalt oxide, the occurrence of interdiffusion among elements and the decline in lithium ion conductivity can be effectively suppressed.

2-1 Mixing Step

In the mixing step, a plurality of raw materials is mixed to obtain a mixture, the plurality of raw materials including a metal element included in the aforementioned formula (1).

In this step, the mixture as a whole, obtained by mixing a plurality of raw materials, includes two or more metal elements of the metal elements included in the aforementioned formula (1).

Furthermore, at least one of the plurality of raw materials used in the this step may be an oxoacid compound including an oxo anion together with a metal ion.

The use of an oxoacid compound as one of the plurality of raw materials allows for the stable formation of a solid electrolyte having a desired property by performing a heat treatment at a relatively low temperature for a relatively short period of time. More specifically, by using an oxoacid compound in this step, it is possible to obtain, in the following step, a calcined body including an oxide different from the ultimately resulting solid electrolyte and an oxoacid compound. As a result, the melting point of the oxide can be lowered, and an adhesive interface with an adherend can be formed while crystal growth is being promoted by performing a firing treatment, which is a heat treatment, at a relatively low temperature for a relatively short period of time.

The oxo anion constituting the oxoacid compound is free of metal elements, such as: a halogen oxoacid; a borate ion; a carbonate ion; an orthocarbonate ion; a carboxylate ion; a silicate ion; a nitrite ion; a nitrate ion; a phosphite ion; a phosphate ion; an arsenate ion; a sulfite ion; a sulfate ion; a sulfonate ion; and a sulfinate ion. Examples of the halogen oxoacid include a hypochlorite ion, a chlorite ion, a chlorate ion, a perchlorate ion, a hypobromite ion, a bromite ion, a bromate ion, a perbromate ion, a hypoiodite ion, an iodite ion, an iodate ion, and a periodate ion. Among these, the oxoacid compound preferably contains at least one of a nitrate ion and a sulfate ion, more preferably a nitrate ion, as the oxo anion.

By using such an oxoacid compound, a melting point of a metal oxide included in the calcined body obtained in the first heating step, to be described in detail later, can be more suitably lowered, and crystal growth of a lithium-containing double oxide can be more effectively promoted. As a result, it is possible to suitably obtain a solid electrolyte having outstanding ionic conductivity even when the second heating step, to be described in detail later, is performed at a lower temperature for a shorter period of time. In the following description, the metal oxide included in the calcined body obtained in the first heating step is also referred to as a "precursor oxide".

Examples of the raw material including a metal element include an elemental metal or an alloy, a compound containing only one metal element in the molecule, and a compound containing a plurality of metal elements in the molecule.

Examples of a lithium compound that is a raw material including Li include a lithium metal salt and a lithium alkoxide, and one or two or more thereof can be used in combination.

Examples of the lithium metal salt include lithium chloride, lithium nitrate, lithium sulfate, lithium acetate, lithium hydroxide, lithium carbonate, and (2,4-pentanedionato) lithium. Furthermore, examples of the lithium alkoxide include lithium methoxide, lithium ethoxide, lithium propoxide, lithium isopropoxide, lithium butoxide, lithium isobutoxide, lithium secondary butoxide, lithium tertiary butoxide, and lithium dipivaloylmethanate. Among these, the lithium compound is preferably one or two or more selected from the group consisting of lithium nitrate, lithium sulfate, and (2,4-pentanedionato)lithium. A hydrate may be used as the raw material including Li.

Examples of a lanthanum compound that is a raw material including La include a lanthanum metal salt, a lanthanum alkoxide, and lanthanum hydroxide, and one or two or more thereof can be used in combination. Examples of the lanthanum metal salt include lanthanum chloride, lanthanum nitrate, lanthanum sulfate, lanthanum acetate, and tris(2,4-pentanedionato)lanthanum. Examples of the lanthanum alkoxide include lanthanum trimethoxide, lanthanum triethoxide, lanthanum tripropoxide, lanthanum triisopropoxide, lanthanum tributoxide, lanthanum triisobutoxide, lanthanum tri-secondary butoxide, lanthanum tri-tertiary butoxide, and lanthanum dipivaloylmethanate. Among these, the lanthanum compound is preferably at least one selected from the group consisting of lanthanum nitrate, tris(2,4-pentanedionato)lanthanum, and lanthanum hydroxide. A hydrate may be used as the raw material including La.

Examples of a zirconium compound that is a raw material including Zr include a zirconium metal salt and a zirconium alkoxide, and one or two or more thereof can be used in combination. Examples of the zirconium metal salt include zirconium chloride, zirconium oxychloride, zirconium oxynitrate, zirconium oxysulfate, zirconium oxyacetate, and zirconium acetate. Furthermore, examples of the zirconium alkoxide include zirconium tetramethoxide, zirconium tetraethoxide, zirconium tetrapropoxide, zirconium tetraisopropoxide, zirconium tetranormal butoxide, zirconium tetraisobutoxide, zirconium tetra-secondary butoxide, zirconium tetra-tertiary butoxide, and zirconium dipivaloylmethanate. Among these, the zirconium compound is preferably zirconium tetranormal butoxide. A hydrate may be used as the raw material including Zr.

Examples of an indium compound that is a raw material including In include an indium metal salt and an indium alkoxide, and one or two or more thereof can be used in combination. Examples of the indium metal salt include indium chloride, indium nitrate, indium sulfate, indium acetate, indium hydroxide, indium carbonate, and tris(2,4-pentanedionato)indium. Furthermore, examples of the indium alkoxide include indium ethoxide and indium isopropoxide. Among these, the indium compound is preferably one or two or more selected from the group consisting of indium nitrate, indium sulfate, and tris(2,4-pentanedionato)indium, more preferably indium nitrate. A hydrate may be used as the raw material including In.

Examples of a niobium compound that is a raw material including Nb include a niobium metal salt, a niobium alkoxide, and niobium acetylacetone, and one or two or more thereof can be used in combination. Examples of the niobium metal salt include niobium chloride, niobium oxychloride, and niobium oxalate. Furthermore, examples of the niobium alkoxide include a niobium ethoxide such as niobium pentaethoxide, niobium propoxide, niobium isopropoxide, and niobium secondary butoxide. Among these, the niobium compound is preferably niobium pentaethoxide. A hydrate may be used as the raw material including Nb.

Examples of a tantalum compound that is a raw material including Ta include a tantalum metal salt and a tantalum alkoxide, and one or two or more thereof can be used in combination. Examples of the tantalum metal salt include tantalum chloride and tantalum bromide. Furthermore, examples of the tantalum alkoxide include, for example, tantalum pentamethoxide, tantalum pentaethoxide, tantalum pentaisopropoxide, tantalum pentanormal propoxide, tantalum pentaisobutoxide, tantalum pentanormal butoxide, tantalum penta-secondary butoxide, and tantalum penta-tertiary butoxide. Among these, the tantalum compound is preferably tantalum pentaethoxide. A hydrate may be used as the raw material including Ta.

Examples of an antimony compound that is a raw material including Sb include an antimony metal salt and an antimony alkoxide, and one or two or more thereof can be used in combination. Examples of the antimony metal salt include antimony bromide, antimony chloride, antimony fluoride, and antimony sulfate. Examples of the antimony alkoxide include antimony trimethoxide, antimony triethoxide, antimony triisopropoxide, antimony trinormal propoxide, antimony triisobutoxide, and antimony trinormal butoxide. Among these, the antimony compound is preferably antimony triisobutoxide and antimony trinormal butoxide. A hydrate may be used as the raw material including Sb.

A solvent may be used to prepare the mixture.

The use of a solvent allows the plurality of raw materials including metal elements included in the aforementioned formula (1) to mix more suitably.

The solvent is not limited and, for example, water or various organic solvents can be used. More specifically, examples of the solvent include an alcohol, a glycol, a ketone, an ester, an ether, an organic acid, an aromatic, and an amide. One of these solvents or a mixed solvent that is a combination of two or more selected from these solvents can be used. Examples of the alcohol include methyl alcohol, ethyl alcohol, n-propyl alcohol, isopropyl alcohol, n-butyl alcohol, allyl alcohol, and 2-n-butoxyethanol. Examples of the glycol include ethylene glycol, propylene glycol, butylene glycol, hexylene glycol, pentanediol, hexanediol, heptanediol, and dipropylene glycol. Examples of the ketone include dimethyl ketone, methyl ethyl ketone, methyl propyl ketone, and methyl isobutyl ketone. Examples of the ester include methyl formate, ethyl formate, methyl acetate, and methyl acetoacetate. Examples of the ether include diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether. Examples of the organic acid include formic acid, acetic acid, 2-ethylbutyric acid, and propionic acid. Examples of the aromatic include toluene, o-xylene, and p-xylene. Examples of the amide include formamide, N,N-dimethylformamide, N,N-diethylformamide, dimethylacetamide, and N-methylpyrrolidone. Among these, the solvent is preferably at least one of 2-n-butoxyethanol and propionic acid.

When a solvent is used to prepare the mixture, as least some of the solvent may be removed prior to the first heating step to be described in detail later.

The removal of solvent prior to the first heating step can be, for example, performed by heating the mixture, or performed in a reduced-pressure environment, or performed at normal temperature and pressure. By removing at least some of the solvent, gelation of the mixture can be suitably facilitated. Note that in the present specification, the phrase "normal temperature and pressure" refers to 25° C. and 1 atmosphere pressure.

Hereinafter, when the removal of solvent is performed by a heat treatment, the heat treatment is also referred to as a pre-heat treatment. The conditions of the pre-heat treatment depend on the boiling point of the solvent, the vapor pressure, or the like, but a heating temperature in the pre-heating treatment is preferably from 50° C. to 250° C., more preferably from 60° C. to 230° C., and even more preferably from 80° C. to 200° C. During the pre-heat treatment, the heating temperature may be changed. For example, the pre-heat treatment may have a first stage, in which heat treatment is performed while the temperature is kept relatively low, and a second stage, in which the temperature is raised after the first stage and heat treatment is performed at a relatively high temperature. In such a case, the highest temperature in the pre-heat treatment is preferably within the range described above.

Furthermore, a heating time of the pre-heat treatment is preferably from 10 minutes to 180 minutes, more preferably from 20 minutes to 120 minutes, and even more preferably from 30 minutes to 60 minutes.

The pre-heat treatment may be performed in any atmosphere, for example, an oxidizing atmosphere such as air or oxygen atmosphere, or a non-oxidizing atmosphere such as an inert gas atmosphere, exemplified by nitrogen atmosphere, helium atmosphere, and argon atmosphere. Furthermore, the pre-heat treatment may be performed under reduced pressure, in vacuum, or under pressure.

In addition, during the pre-heat treatment, the atmosphere may be held at substantially the same condition or may be changed to a different condition. For example, the pre-heat treatment may have a first stage, in which heat treatment is performed at normal temperature and pressure, and a second stage, in which heat treatment is performed in a reduced-pressure environment after the first stage.

2-2 First Heating Step

In the first heating step, the mixture resulting from the mixing step, for example, a gelled mixture, is subjected to the first heat treatment to form a calcined body.

In particular, when an oxoacid compound is used as part of the raw materials, it is possible to obtain a calcined body including a precursor oxide, which is an oxide different from the ultimately resulting solid electrolyte, and an oxoacid compound.

A heating temperature in the first heating step is not limited, but is preferably from 500° C. to 650° C., more preferably from 510° C. to 650° C., and even more preferably from 520° C. to 600° C.

By satisfying such a range, it is possible to effectively prevent, for example, undesirable vaporization of a metal element that will constitute the ultimately resulting solid electrolyte, especially the vaporization of Li, a metal material that tends to volatilize easily. As such, the composition of the ultimately resulting solid electrolyte can be more strictly controlled, and the solid electrolyte can be produced more efficiently.

During the first heating step, the heating temperature may be changed. For example, the first heating step may have a first stage, in which heat treatment is performed while the temperature is kept relatively low, and a second stage, in which the temperature is raised after the first stage and heat treatment is performed at a relatively high temperature. In such a case, the highest temperature in the first heating step is preferably within the range described above.

In addition, a heating time in the first heating step, in particular, the heating time at a heating temperature of from 500° C. to 650° C., is preferably from 5 minutes to 180 minutes, more preferably from 10 minutes to 120 minutes, and even more preferably from 15 minutes to 90 minutes.

The first heating step may be performed in any atmosphere, for example, an oxidizing atmosphere such as air or oxygen atmosphere, or a non-oxidizing atmosphere such as an inert gas atmosphere, exemplified by nitrogen atmosphere, helium atmosphere, and argon atmosphere. Furthermore, the first heating step may be performed under reduced pressure, in vacuum, or under pressure. In particular, the first heating step is preferably performed in an oxidizing atmosphere.

In addition, during the first heating step, the atmosphere may be held at substantially the same condition or may be changed to a different condition. For example, the first heating step may have a first stage, in which heat treatment is performed in an inert gas atmosphere, and a second stage, in which heat treatment is performed in an oxidizing atmosphere after the first stage.

The calcined body obtained as described above typically includes a precursor oxide having a crystal phase different from that of the ultimately resulting solid electrolyte, that is, a solid electrolyte represented by the aforementioned formula (1) at normal temperature and pressure. Note that in the present specification, "different" with respect to crystal phase is a broad concept, covering situations in which the types of crystal phases are different, and in which at least one lattice constant differs even if the crystal phases are the same.

Examples of the crystal phase of the precursor oxide include cubic crystals such as pyrochlore-type crystals and those having a perovskite structure, a rock salt-type structure, a diamond structure, a fluorite-type structure, and a spinel-type structure, orthorhombic crystals such as those of the ramsdellite-type, and trigonal crystals such as those of the corundum-type. Among these, pyrochlore-type crystals are preferred.

This makes it possible to suitably obtain a solid electrolyte having outstanding ionic conductivity even when the second heating step, to be described later, is performed at a lower temperature for a shorter period of time.

A crystal grain size of the precursor oxide is not limited, but is preferably from 10 to 200 nm, more preferably from 15 nm to 180 nm, and even more preferably from 20 nm to 160 nm.

Satisfying such a range facilitates the phenomenon of depressing of melting point concurrent with increasing surface energy, that is, the Gibbs-Thomson effect, which can further reduce, for example, a melting temperature of the precursor oxide or a firing temperature in the second heating step. Satisfying such a range is also advantageous for improving the bonding between a solid electrolyte, produced using the method according to an embodiment of the present disclosure, and a dissimilar material, or for reducing defect density.

The precursor oxide is preferably substantially composed of a single crystal phase.

When the precursor oxide is substantially composed of a single crystal phase, crystal phase transition occurs substantially once during the production of a solid electrolyte using the method according to an embodiment of the present disclosure, that is, the formation of a high-temperature crystal phase. As a result, phenomena such as segregation of elements during crystal phase transition and formation of contaminant crystals due to thermal decomposition are suppressed, and various properties of the solid electrolyte produced are further improved.

Note that when only one exothermic peak in the range of from 300° C. to 1000° C. is observed for the calcined body obtained in the first heating step during a TG-DTA at a heating rate of 10° C./minute, it can be determined that the precursor oxide is "substantially composed of a single crystal phase".

A composition of the precursor oxide is not limited, but the precursor oxide is preferably a double oxide. In particular, the precursor oxide is preferably a double oxide including Li, La, and In.

Such a precursor oxide makes it possible to suitably obtain a solid electrolyte having outstanding ionic conductivity even when the heat treatment in the second heating step, to be described later, is performed at a lower temperature for a shorter period of time. This will also make it possible, for example, to improve the adhesiveness of the resulting solid electrolyte with respect to a cathode active material or an anode active material in an all-solid-state secondary battery, to achieve composite so as to give a better adhesive interface, and to improve a property and reliability of an all-solid-state secondary battery.

In addition, although most of the solvent used in the production process of the calcined body obtained as described above is typically removed, some of the solvent may remain in the calcined body. However, a content of the solvent in the calcined body is preferably 1.0 mass % or less, more preferably 0.1 mass % or less.

2-3 Second Heating Step

In the second heating step, the calcined body obtained in the first heating step is subjected to a second heat treatment to form a crystalline solid electrolyte represented by the aforementioned formula (1).

In particular, when the calcined body resulting from the first heating step includes an oxoacid compound, the melting point of the precursor oxide can be suitably lowered, the crystal growth of the lithium-containing double oxide can be promoted, and a solid electrolyte having a desired property can be stably formed by performing a heat treatment at a relatively low temperature for a relatively short period of time. Furthermore, the adhesiveness between the solid electrolyte formed and the adherend can be improved.

Note that the second heating step may be performed after another component is mixed with the aforementioned calcined body.

For example, a second heating step may be performed using a mixture of the calcined body and an oxoacid compound.

Even in such a case, the same effects as described above can be obtained.

Specific examples of the oxoacid compound that can be mixed with the calcined body include oxoacid compounds included in the metal compounds listed as examples of the raw materials for the aforementioned mixture.

In the second heating step, the aforementioned calcined body may be subjected to the heating step as a mixture with an active material such as a cathode active material or an anode active material.

This allows an electrode, such as a cathode or an anode, including both a solid electrolyte and an active material to be suitably produced. The cathode active material and the anode active material will be described in detail later.

The composition to be subjected to the second heating step as a whole contains a plurality of metal elements that are constituent elements of the solid electrolyte. Usually, the ratio of the contents of these metal elements corresponds to the composition of the target solid electrolyte, that is, the content ratio of the metal elements in the aforementioned formula (1).

When the composition to be subjected to the second heating step includes an oxoacid compound, a content of the oxoacid compound in the composition is not limited, but is preferably from 0.1 mass % to 20 mass %, more preferably from 1.5 mass % to 15 mass %, and even more preferably from 2.0 mass % to 10 mass %.

By satisfying such a range, heat treatment in the second heating step can be suitably performed at a lower temperature for a shorter period of time while the undesirable presence of the oxoacid compound in the final resulting solid electrolyte can be more surely prevented, and a solid electrolyte having outstanding ionic conductivity can be obtained.

A content of the precursor oxide in the composition to be subjected to the second heating step is not limited, but is preferably from 35 mass % to 90 mass %, more preferably from 45 mass % to 85 mass %.

The content of the precursor oxide in the composition to be subjected to the second heating step, represented by XP [mass %], and the content of the oxoacid compound in the composition to be subjected to the second heating step, represented by XO [mass %], satisfy one of the following relationships, listed in an order of increasing preference: $0.013 \leq XO/XP \leq 0.58$, $0.023 \leq XO/XP \leq 0.34$, or $0.03 \leq XO/XP \leq 0.19$.

By satisfying such a range, heat treatment in the second heating step can be suitably performed at a lower temperature for a shorter period of time while the undesirable presence of the oxoacid compound in the final resulting solid electrolyte can be more surely prevented, and a solid electrolyte having outstanding ionic conductivity can be obtained.

A heating temperature in the second heating step is not limited, but is usually higher than the heating temperature in the first heating step, and is preferably from 800° C. to 1000° C., more preferably from 810° C. to 980° C., and even more preferably from 820° C. to 950° C.

Satisfying such a range allows for the stable formation of a solid electrolyte having a desired property by performing a heat treatment at a relatively low temperature for a relatively short period of time. In addition, since a solid electrolyte can be produced by performing a heat treatment at a relatively low temperature for a relatively short period of time, productivity of, for example, a solid electrolyte or an all-solid-state battery having a solid electrolyte can be further improved. This is also favorable from the perspective of energy conservation.

During the second heating step, the heating temperature may be changed. For example, the second heating step may have a first stage, in which heat treatment is performed while the temperature is kept relatively low, and a second stage, in which the temperature is raised after the first stage and heat treatment is performed at a relatively high temperature. In such a case, the highest temperature during the second heating step is preferably within the range described above.

A heating time during the second heating step, in particular, the heating time at a heating temperature of from 800° C. to 1000° C., is not limited, but is preferably from 5 minutes to 600 minutes, more preferably from 10 minutes to 540 minutes, and even more preferably from 15 minutes to 500 minutes.

Satisfying such a range allows for the stable formation of a solid electrolyte having a desired property by performing a heat treatment at a relatively low temperature for a relatively short period of time. In addition, since a solid electrolyte can be produced by performing a heat treatment at a relatively low temperature for a relatively short period of time, productivity of, for example, a solid electrolyte or an all-solid-state battery having a solid electrolyte can be further improved. This is also favorable from the perspective of energy conservation.

The second heating step may be performed in any atmosphere, for example, an oxidizing atmosphere such as air or oxygen atmosphere, or a non-oxidizing atmosphere such as an inert gas atmosphere, exemplified by nitrogen atmosphere, helium atmosphere, and argon atmosphere. Furthermore, the heating step may be performed under reduced pressure, in vacuum, or under pressure. In particular, the second heating step is preferably performed in an oxidizing atmosphere.

In addition, during the second heating step, the atmosphere may be held at substantially the same condition or may be changed to a different condition.

Even when an oxoacid compound is used as a raw material, the solid electrolyte obtained in a manner as described above is usually substantially free of oxoacid compound. More specifically, the content of the oxoacid compound in the obtained solid electrolyte is usually 100 ppm or less, and in particular, preferably 50 ppm or less, more preferably 10 ppm or less.

By satisfying such a range, the content of undesirable impurities in the solid electrolyte can be suppressed, and the property and reliability of the solid electrolyte can be further improved.

3 Composite

Next, a composite according to an embodiment of the present disclosure will be described.

The composite according to an embodiment of the present disclosure includes an active material and the solid electrolyte according to an embodiment of the present disclosure covering a portion of a surface of the active material is coated with the solid electrolyte.

As such, a composite with sufficiently low grain boundary resistance between the active material and the solid electrolyte can be provided. Such a composite can be suitably applied to a cathode mixture or an anode mixture of a secondary battery as described below. As a result, the property and reliability of the secondary battery as a whole can be improved.

Examples of the active material constituting the composite according to an embodiment of the present disclosure include a cathode active material and an anode active material.

The cathode active material can be, for example, a lithium double oxide that contains at least Li and that is composed of any one or more elements selected from the group consisting of V, Cr, Mn, Fe, Co, Ni, and Cu. Examples of such a double oxide include $LiCoO_2$, $LiNiO_2$, $LiMn_2O_4$, $Li_2Mn_2O_3$, $LiCr_{0.5}Mn_{0.5}O_2$, $LiFePO_4$, $Li_2FeP_2O_7$, $LiMnPO_4$, $LiFeBO_3$, $Li_3V_2(PO_4)_3$, $Li_2CuO_2$, $Li_2FeSiO_4$, and $Li_2MnSiO_4$. Additional examples of the cathode active material include a fluoride such as $LiFeF_3$, a boride complex compound such as $LiBH_4$ and $Li_4BN_3H_{10}$, an iodine complex compound such as a polyvinylpyridine-iodine complex, and a non-metal compound such as sulfur.

Meanwhile, examples of the anode active material include a lithium double oxide such as $Nb_2O_5$, $V_2O_5$, $TiO_2$, $In_2O_3$, ZnO, $SnO_2$, NiO, ITO, AZO, GZO, ATO, FTO, $Li_4Ti_5O_{12}$, and $Li_2Ti_3O_7$. Additional examples include a metal or an alloy such as Li, Al, Si, Si—Mn, Si—Co, Si—Ni, Sn, Zn, Sb, Bi, In, and Au, a carbon material, and a substance in which lithium ions are inserted between layers of a carbon material such as $LiC_{24}$ and $LiC_6$.

The composite according to an embodiment of the present disclosure can be suitably produced by, for example, using the method for producing a solid electrolyte described in [2] above. More specifically, for example, the composite according to an embodiment of the present disclosure can be suitably produced by firing a mixture of the aforementioned calcined body and the active material, that is, subjecting the mixture to a second heat treatment.

4 Secondary Battery

Next, a secondary battery to which an embodiment of the present disclosure is applied will be described.

The secondary battery according to an embodiment of the present disclosure includes the aforementioned solid electrolyte according to an embodiment of the present disclosure, and can be produced by, for example, using the aforementioned method for producing a solid electrolyte according to an embodiment of the present disclosure.

Such a secondary battery has excellent charge and discharge properties.

4-1. Secondary Battery of First Embodiment

A secondary battery according to a first embodiment will be described below.

FIG. 1 is a schematic perspective view illustrating a configuration of a lithium ion battery that is the secondary battery according to the first embodiment.

As illustrated in FIG. 1, a lithium ion battery 100 that is a secondary battery includes a cathode 10, a solid electrolyte layer 20, and an anode 30, the solid electrolyte layer 20 and the anode 30 being stacked sequentially at the cathode 10. Furthermore, the lithium ion battery 100 has a current collector 41 and a current collector 42. The current collector 41 is provided on the side of a surface of the cathode 10 that is opposite to the surface of the cathode 10 facing the solid electrolyte layer 20, the current collector 41 being in contact with the cathode 10. The current collector 42 is provided on the side of a surface of the anode 30 that is opposite to the surface of the anode 30 facing the solid electrolyte layer 20, the current collector 42 being in contact with the anode 30. Since the cathode 10, the solid electrolyte layer 20, and the anode 30 are all composed of solid phase materials, the lithium ion battery 100 is an all-solid-state secondary battery that can be charged and discharged.

A shape of the lithium ion battery 100 is not limited, and may be, for example, a polygonal disk shape. In the configuration illustrated, the lithium ion battery 100 has a disk shape. A size of the lithium ion battery 100 is not limited. The diameter of the lithium ion battery 100 is, for example, from 10 mm to 20 mm, and the thickness of the lithium ion battery 100 is, for example, from 0.1 mm to 1.0 mm.

As such, the lithium ion battery 100 is not only compact and thin but also an all-solid-state battery that can be charged and discharged. Therefore, the lithium ion battery 100 can be suitably used as a power source for a personal digital assistant such as a smart phone. Note that, as described below, the lithium ion battery 100 may also be used in other applications in addition to power source for a personal digital assistant.

Each of the constituents of the lithium ion battery 100 will be described below.

4-1-1 Solid Electrolyte Layer

The solid electrolyte layer 20 is composed of a material containing the aforementioned solid electrolyte according to an embodiment of the present disclosure.

As a result, the solid electrolyte layer 20 has excellent lithium ion conductivity. Furthermore, the solid electrolyte layer 20 can have excellent adhesiveness to the cathode 10 and the anode 30. As such, the lithium ion battery 100 as a whole can have particularly excellent property and reliability.

The solid electrolyte layer 20 may include a component in addition to the aforementioned solid electrolyte according to an embodiment of the present disclosure. For example, the solid electrolyte layer 20 may include another solid electrolyte together with the aforementioned solid electrolyte according to an embodiment of the present disclosure.

However, a content of the solid electrolyte according to an embodiment of the present disclosure in the solid electrolyte layer 20 is preferably 80 mass % or greater, more preferably 90 mass % or greater, and even more preferably 95 mass % or greater.

This allows the effects according to an embodiment of the present disclosure as described above to be exhibited more prominently.

A thickness of the solid electrolyte layer 20 is not limited, but is preferably from 0.3 μm to 1000 μm, more preferably from 0.5 μm to 100 μm, from the viewpoints of charge and discharge rate.

In addition, from the viewpoints of preventing short circuits between the cathode 10 and the anode 30 caused by lithium dendrites deposited on the anode 30 side, it is preferable that a sintered density, that is, a value obtained by dividing a measured weight of the solid electrolyte layer 20 by the product of an apparent volume of the solid electrolyte layer 20 and a theoretical density of the solid electrolyte material, is 50% and greater, more preferably 90% and greater.

Examples of a method for forming the solid electrolyte layer 20 include a green sheet method, a press firing method, and a casting sintering method. Specific examples of the method for forming the solid electrolyte layer 20 are described in detail later. In addition, the solid electrolyte layer 20 may have, for example, a three-dimensional pattern structure, such as a dimple, a trench, or a pillar, formed at a surface in contact with the cathode 10 or the anode 30 for the purpose of, for example, improving the adhesiveness between the solid electrolyte layer 20 and the cathode 10 or the anode 30, or improving the output or battery capacity of the lithium ion battery 100 by increasing the specific surface area.

4-1-2 Cathode

The cathode 10 may be any as long as it is composed of a cathode active material that allows repeated electrochemical storage and release of lithium ions.

Specifically, the cathode active material constituting the cathode 10 can be, for example, a lithium double oxide that contains at least Li and that is composed of any one or more elements selected from the group consisting of V, Cr, Mn, Fe, Co, Ni, and Cu. Examples of such a double oxide include $LiCoO_2$, $LiNiO_2$, $LiMn_2O_4$, $Li_2Mn_2O_3$, $LiCr_{0.5}Mn_{0.5}O_2$, $LiFePO_4$, $Li_2FeP_2O_7$, $LiMnPO_4$, $LiFeBO_3$, $Li_3V_2(PO_4)_3$, $Li_2CuO_2$, $Li_2FeSiO_4$, and $Li_2MnSiO_4$. Additional examples of the cathode active material constituting the cathode 10 include a fluoride such as $LiFeF_3$, a boride complex compound such as $LiBH_4$ and $Li_4BN_3H_{10}$, an iodine complex compound such as a polyvinylpyridine-iodine complex, and a non-metal compound such as sulfur.

In view of conductivity and ion diffusion distance, the cathode 10 is preferably formed as a thin film at one surface of the solid electrolyte layer 20.

A thickness of the cathode 10 as a thin film is not limited, but is preferably from 0.1 μm to 500 μm, more preferably from 0.3 μm to 100 μm.

Examples of a method for forming the cathode 10 include a vapor deposition method, such as a vacuum deposition method, a sputtering method, a CVD method, a PLD method, an ALD method, and an aerosol deposition method, as well as a chemical deposition method using a solution, such as a sol-gel method and a MOD method. In an additional example of the method for forming the cathode 10, fine particles of a cathode active material are slurried with a suitable binder to form a coating film by squeegee or screen printing, and the coating film is dried and fired and then baked onto a surface of the solid electrolyte layer 20.

4-1-3 Anode

The anode 30 may be any as long as it is composed of an anode active material, that is, a material that allows repeated electrochemical storage and release of lithium ions at a potential lower than that of the material selected for the cathode 10.

Specific examples of the anode active material constituting the anode 30 include a lithium double oxide such as $Nb_2O_5$, $V_2O_5$, $TiO_2$, $In_2O_3$, ZnO, $SnO_2$, NiO, ITO, AZO, GZO, ATO, FTO, $Li_4Ti_5O_{12}$, and $Li_2Ti_3O_7$. Additional examples include a metal or an alloy such as Li, Al, Si, Si—Mn, Si—Co, Si—Ni, Sn, Zn, Sb, Bi, In, and Au, a carbon material, and a substance in which lithium ions are inserted between layers of a carbon material such as $LiC_{24}$ and $LiC_6$.

In view of conductivity and ion diffusion distance, the anode 30 is preferably formed as a thin film at one surface of the solid electrolyte layer 20.

A thickness of the anode 30 as a thin film is not limited, but is preferably from 0.1 μm to 500 μm, more preferably from 0.3 μm to 100 μm.

Examples of a method for forming the anode 30 include a vapor deposition method, such as a vacuum deposition method, a sputtering method, a CVD method, a PLD method, an ALD method, and an aerosol deposition method, as well as a chemical deposition method using a solution, such as a sol-gel method and a MOD method. In an additional example of the method for forming the anode 30, fine particles of an anode active material are slurried with a suitable binder to form a coating film by squeegee or screen printing, and the coating film is dried and fired and then baked onto a surface of the solid electrolyte layer 20.

4-1-4 Current Collector

The current collectors 41 and 42 are conductors provided to transfer electrons to and from the cathode 10 or the anode 30. The current collector is typically composed of a material having a sufficiently small electrical resistance and having an electrical conduction property or mechanical structure that does not substantially change because of charging and discharging. Specifically, for example, Al, Ti, Pt, or Au can be used as a constituent material of the current collector 41 of the cathode 10. Furthermore, for example, Cu can be suitably used as a constituent material of the current collector 42 of the anode 30.

The current collectors 41 and 42 are typically provided in a way that a contact resistance between the current collector 41 and the cathode 10 as well as between the current collector 42 and the anode 30 is reduced. Examples of a shape of the current collectors 41 and 42 include a disk shape and a mesh shape.

A thickness of the current collectors 41 and 42 is not limited, but is preferably from 7 μm to 85 μm, more preferably from 10 μm to 60 μm.

In the configuration illustrated, the lithium ion battery 100 includes a pair of current collectors 41 and 42. However, when a plurality of lithium ion batteries 100 are stacked and electrically connected in series for use, the lithium ion battery 100 may have a configuration in which only the current collector 41 of the current collectors 41 and 42 is provided.

The lithium ion battery 100 may be used in any application. Examples of electronic devices to which the lithium ion battery 100 is applied as a power source include: personal computers; digital cameras; mobile phones; smart phones; music players; tablet terminals; watches; smart watches; various printers such as inkjet printers; televisions; projectors; head-up displays; wearable terminals such as wireless headphones, wireless earbuds, smart glasses, and head-mounted displays; video cameras; video tape recorders; automotive navigation devices; dashboard camera recorders; pagers; electronic planners; electronic dictionaries; electronic translation devices; calculators; electronic game devices; toys; word processors; workstations; robots; videophones; security monitors; electronic binoculars; POS terminals; medical devices; fish finders; various measuring devices; mobile terminal base station equipment; various measuring instruments for vehicles, railway vehicles, aircrafts, helicopters, and ships; flight simulators; and network servers. Furthermore, the lithium ion battery 100 may be applied to, for example, a mobile body such as an automobile or a ship. More specifically, the lithium ion battery 100 can be suitably applied as a rechargeable battery for, for example, electric vehicles, plug-in hybrid electric vehicles, hybrid vehicles, and fuel cell vehicles. Furthermore, the lithium ion battery 100 can also be applied to, for example, household power sources, industrial power sources, and solar power rechargeable batteries.

4-2 Secondary Battery of Second Embodiment

A secondary battery according to a second embodiment will be described below.

Figure 2:
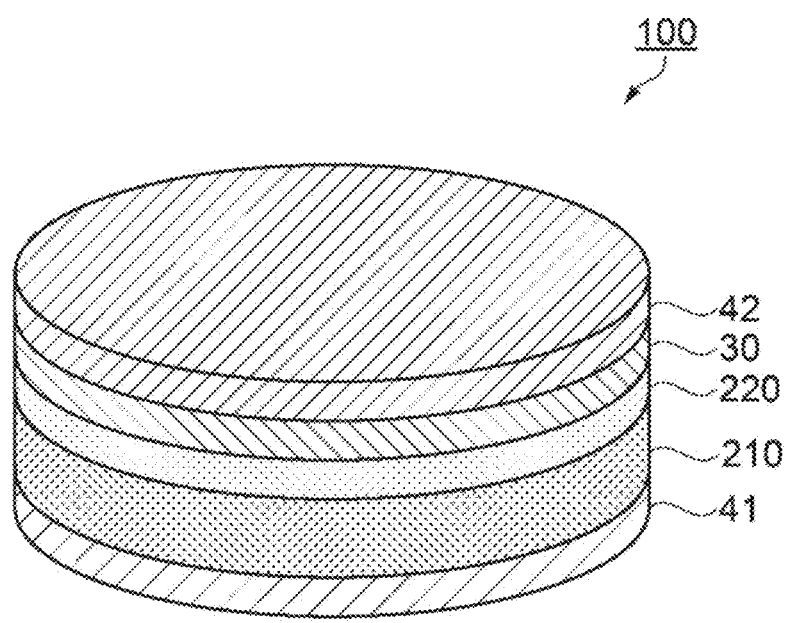
FIG. 2 is a schematic perspective view illustrating a configuration of a lithium ion battery that is a secondary battery according to a second embodiment.
Figure 3:
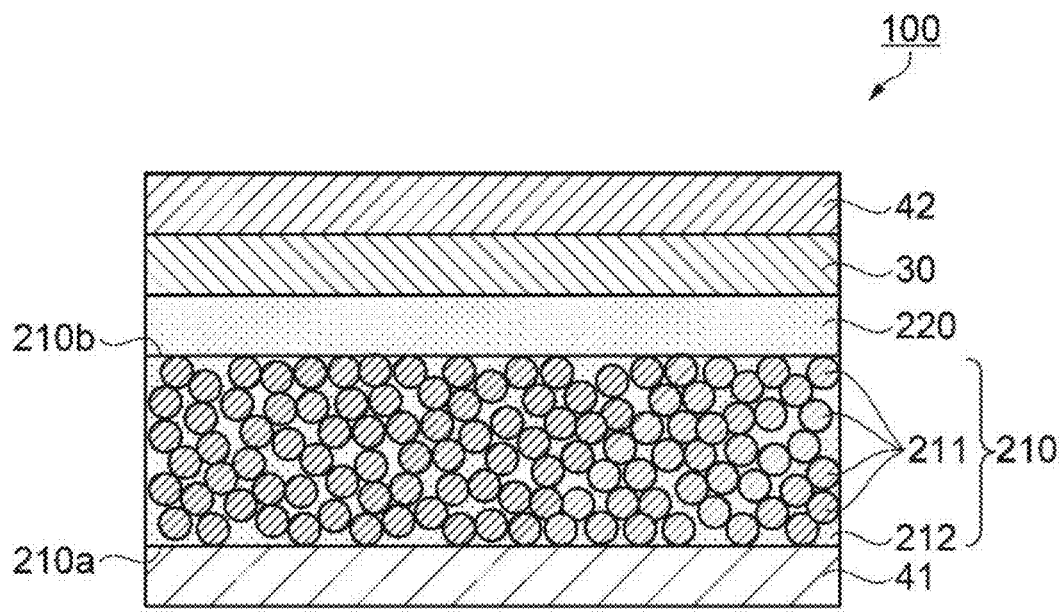
FIG. 3 is a schematic cross-sectional view illustrating a structure of a lithium ion battery that is the secondary battery according to the second embodiment.

FIG. 2 is a schematic perspective view illustrating a configuration of a lithium ion battery that is the secondary battery according to the second embodiment, while FIG. 3 is a schematic cross-sectional view illustrating a structure of a lithium ion battery that is the secondary battery according to the second embodiment.

In the description below, the secondary battery according to the second embodiment will be described with reference to these drawings with a focus on differences from the embodiment described above, and descriptions of similar matters will be omitted.

As illustrated in FIG. 2, a lithium ion battery 100 that is a secondary battery according to the present embodiment includes a cathode mixture 210 that functions as a cathode, an electrolyte layer 220, and an anode 30, the electrolyte layer 220 and the anode 30 being stacked sequentially at the cathode mixture 210. Furthermore, the lithium ion battery 100 has a current collector 41 and a current collector 42. The current collector 41 is provided on the side of a surface of the cathode mixture 210 that is opposite to the surface of the cathode mixture 210 facing the electrolyte layer 220, the current collector 41 being in contact with the cathode mixture 210. The current collector 42 is provided on the side of a surface of the anode 30 that is opposite to the surface of the anode 30 facing the electrolyte layer 220, the current collector 42 being in contact with the anode 30.

The cathode mixture 210 and the electrolyte layer 220, which are different from the configuration of the lithium ion battery 100 according to the embodiment described above, will be described below.

4-2-1 Cathode Mixture

As illustrated in FIG. 3, the cathode mixture 210 in the lithium ion battery 100 of the second embodiment includes a particulate cathode active material 211 and a solid electrolyte 212. In such a cathode mixture 210, the interfacial surface area between the particulate cathode active material 211 and the solid electrolyte 212 is increased, and the battery reaction speed of the lithium ion battery 100 can be further increased.

An average particle size of the cathode active material 211 is not limited, but is preferably from 0.1 μm to 150 μm, more preferably from 0.3 μm to 60 μm.

Satisfying such a range facilitates the realization of both an actual capacity density that is close to a theoretical capacity of the cathode active material 211 and a high charge and discharge rate.

Note that in the present specification, the term "average particle size" refers to an average particle size based on volume, and can be obtained by, for example, adding a sample to methanol, dispersing the mixture with an ultrasonic disperser for 3 minutes, and subjecting the dispersion to measurement by a Coulter Counter analyzer with a 50 μm aperture (model TA-II, available from Coulter Electronics, Ins.).

A particle size distribution of the cathode active material 211 is not limited, and, for example, in a particle size distribution with one peak, the half-value width of the peak can be from 0.15 μm to 19 μm. Furthermore, a number of peaks in the particle size distribution of the cathode active material 211 may be two or more.

Note that in FIG. 3, the shape of the particulate cathode active material 211 is illustrated as a spherical shape, but a shape of the cathode active material 211 is not limited to a spherical shape. For example, the cathode active material 211 may take a variety of shapes, such as a column shape, a disk shape, a scaly shape, a hollow shape, and an amorphous shape, and may take two or more of these shapes in combination.

Examples of a constituent material of the cathode active material 211 can be the same as those listed as a constituent material of the cathode 10 of the first embodiment described above.

In addition, a coating layer may be formed at a surface of the cathode active material 211 for the purpose of, for example, reducing the interfacial resistance between the cathode active material 211 and the solid electrolyte 212, or improving electronic conductivity. For example, a thin film of, for example, $LiNbO_3$, $Al_2O_3$, $ZrO_2$, or $Ta_2O_5$ can be formed at a surface of a particle of the cathode active material 211 made of $LiCoO_2$ to further reduce the interfacial resistance of lithium ion conduction. A thickness of the coating layer is not limited, but is preferably from 3 nm to 1 μm.

In the second embodiment, the cathode mixture 210 includes the solid electrolyte 212 in addition to the cathode active material 211 described above. The solid electrolyte 212 is present in a manner of filling in the gaps between the particles of the cathode active material 211 or contacting, in particular, adhering, to a surface of the cathode active material 211.

The solid electrolyte 212 is composed of a material including the aforementioned solid electrolyte according to an embodiment of the present disclosure.

As a result, the solid electrolyte 212 has outstanding lithium ion conductivity. Furthermore, the solid electrolyte 212 has excellent adhesiveness to the cathode active material 211 and the electrolyte layer 220. As such, the lithium ion battery 100 as a whole can have particularly excellent property and reliability.

A content of the cathode active material 211 in the cathode mixture 210, represented by XA [mass %], and a content of the solid electrolyte 212 in the cathode mixture 210, represented by XS [mass %], satisfy one of the following relationships, listed in an order of increasing preference: $0.1 \leq XS/XA \leq 8.3$, $0.3 \leq XS/XA \leq 2.8$, or $0.6 \leq XS/XA \leq 1.4$.

In addition, the cathode mixture 210 may include a conductivity aid, a binder, or the like in addition to the cathode active material 211 and the solid electrolyte 212.

However, a content of a component that is not the cathode active material 211 or the solid electrolyte 212 in the cathode mixture 210 is preferably 10 mass % or less, more preferably 7 mass % or less, and even more preferably 5 mass % or less.

Any conductor may be used as the conductivity aid as long as the electrochemical interaction at the cathode reaction potential can be ignored. More specifically, examples of the conductivity aid include: a carbon material such as acetylene black, ketjen black, and carbon nanotubes; a noble metal such as palladium and platinum; and a conductive oxide such as $SnO_2$, $ZnO$, $RuO_2$, $ReO_3$, and $Ir_2O_3$.

A thickness of the cathode mixture 210 is not limited, but is preferably from 0.1 μm to 500 μm, more preferably from 0.3 μm to 100 μm.

4-2-2 Electrolyte Layer

The electrolyte layer 220 is preferably composed of the same material or the same type of material as that of the solid electrolyte 212 from the viewpoint of interfacial impedance between the electrolyte layer 220 and the cathode mixture 210, but the electrolyte layer 220 may also be composed of a material different than that of the solid electrolyte 212. For example, the electrolyte layer 220 may be composed of a material including the aforementioned solid electrolyte according to an embodiment of the present disclosure but having a composition different from that of the solid electrolyte 212. Furthermore, the electrolyte layer 220 may be composed of a crystalline or amorphous oxide solid electrolyte, a crystalline or amorphous sulfide solid electrolyte, a crystalline or amorphous nitride solid electrolyte, a crystalline or amorphous a halide solid electrolyte, a crystalline or amorphous a hydride solid electrolyte, a crystalline or amorphous a dry polymer electrolyte, or a crystalline or amorphous quasi-solid electrolyte, that is not the solid electrolyte according to an embodiment of the present disclosure; or, the electrolyte layer 220 may be composed of a material that is a combination of two or more selected from the electrolytes listed above.

When the electrolyte layer 220 is composed of a material including the solid electrolyte according to an embodiment of the present disclosure, a content of the solid electrolyte according to an embodiment of the present disclosure in the electrolyte layer 220 is preferably 80 mass % or greater, more preferably 90 mass % or greater, and even more preferably 95 mass % or greater.

This allows the effects according to an embodiment of the present disclosure as described above to be exhibited more prominently.

Examples of the crystalline oxide include $Li_{0.35}La_{0.55}TiO_3$, $Li_{0.2}La_{0.27}NbO_3$, and a perovskite-type crystal or a perovskite-like crystal in which some of the elements constituting the two aforementioned crystals are substituted by N, F, Al, Sr, Sc, Nb, Ta, Sb, or a lanthanoid element; $Li_7La_3Zr_2O_{12}$, $Li_5La_3Nb_2O_{12}$, $Li_5BaLa_2TaO_{12}$, and a garnet-type crystal or a garnet-like crystal in which some of the elements constituting the three aforementioned crystals are substituted by N, F, Al, Sr, Sc, Nb, Ta, Sb, or a lanthanide element; $Li_{1.3}Ti_{1.7}Al_{0.3}(PO_4)_3$, $Li_{1.4}Al_{0.4}Ti_{1.6}(PO_4)_3$, $Li_{1.4}Al_{0.4}Ti_{1.4}Ge_{0.2}(PO_4)_3$, and a NASICON-type crystal in which some of the elements constituting the three aforementioned crystals are substituted by N, F, Al, Sr, Sc, Nb, Ta, Sb, or a lanthanoid element; a LISION-type crystal such as $Li_{14}ZnGe_4O_{16}$; and other crystalline substances such as $Li_{3.4}V_{0.6}Si_{0.4}O_4$, $Li_{3.6}V_{0.4}Ge_{0.6}O_4$, and $Li_{2+x}C_{1-x}B_xO_3$.

Examples of the crystalline sulfide include $Li_{10}GeP_2S_{12}$, $Li_{9.6}P_3S_{12}$, $Li_{9.54}Si_{1.74}P_{1.44}S_{11.7}Cl_{0.3}$, and $Li_3PS_4$.

Examples of other amorphous substances include $Li_2O$—$TiO_2$, $La_2O_3$—$Li_2O$—$TiO_2$, $LiNbO_3$, $LiSO_4$, $Li_4SiO_4$, $Li_3PO_4$—$Li_4SiO_4$, $Li_4GeO_4$—$Li_3VO_4$, $Li_4SiO_4$—$Li_3VO_4$, $Li_4GeO_4$—$Zn_2GeO_2$, $Li_4SiO_4$—$LiMoO_4$, $Li_4SiO_4$—$Li_4ZrO_4$, $SiO_2$—$P_2O_5$—$Li_2O$, $SiO_2$—$P_{20.5}$—$LiCl$, $Li_2O$—

LiCl—$B_2O_3$, $LiAlCl_4$, $LiAlF_4$, LiF—$Al_2O_3$, LiBr—$Al_2O_3$, $Li_{2.88}PO_{3.73}N_{0.14}$, $Li_3N$—LiCl, $Li_6NBr_3$, $Li_2S$—$SiS_2$, and $Li_2S$—$SiS_2$—$P_2S_5$.

When the electrolyte layer 220 is composed of a crystalline substance, the crystalline substance preferably has a crystal structure such as a cubic crystal structure with a small crystal surface anisotropy in the direction of lithium ion conduction. In addition, when the electrolyte layer 220 is composed of an amorphous substance, the anisotropy of lithium ion conduction is reduced. Therefore, either a crystalline substance or an amorphous substance as those described above is preferable as the solid electrolyte constituting the electrolyte layer 220.

A thickness of the electrolyte layer 220 is preferably from 0.1 μm to 100 μm, more preferably from 0.2 μm to 10 μm. When the thickness of the electrolyte layer 220 is a value within the ranges described above, the internal resistance of the electrolyte layer 220 can be further reduced, and the occurrence of a short circuit between the cathode mixture 210 and the anode 30 can be more effectively prevented.

In addition, the electrolyte layer 220 may have a three-dimensional pattern structure, such as a dimple, a trench, or a pillar, formed at a surface in contact with the anode 30 for the purpose of, for example, improving the adhesiveness between the electrolyte layer 220 and the anode 30, or improving the output or battery capacity of the lithium ion battery 100 by increasing the specific surface area.

4-3 Secondary Battery of Third Embodiment

A secondary battery according to a third embodiment will be described below.

Figure 4:
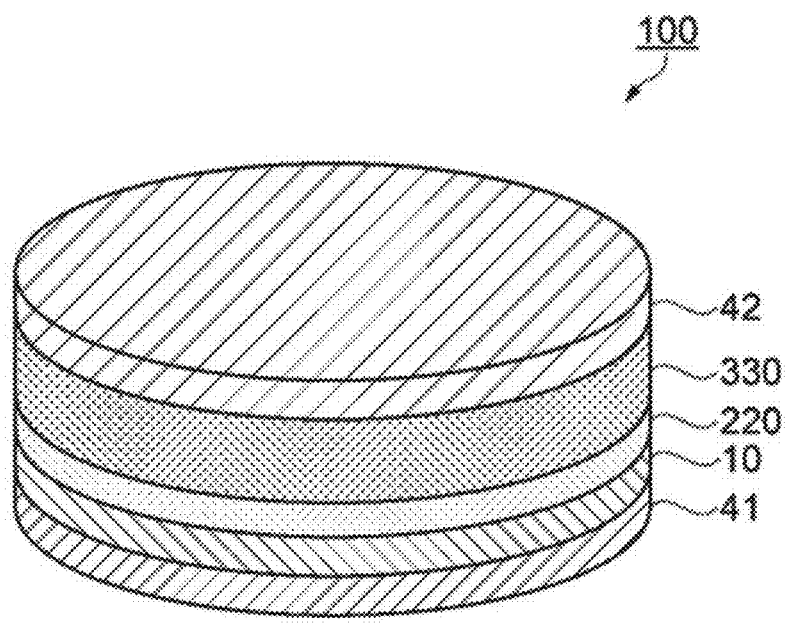
FIG. 4 is a schematic perspective view illustrating a configuration of a lithium ion battery that is a secondary battery according to a third embodiment.
Figure 5:
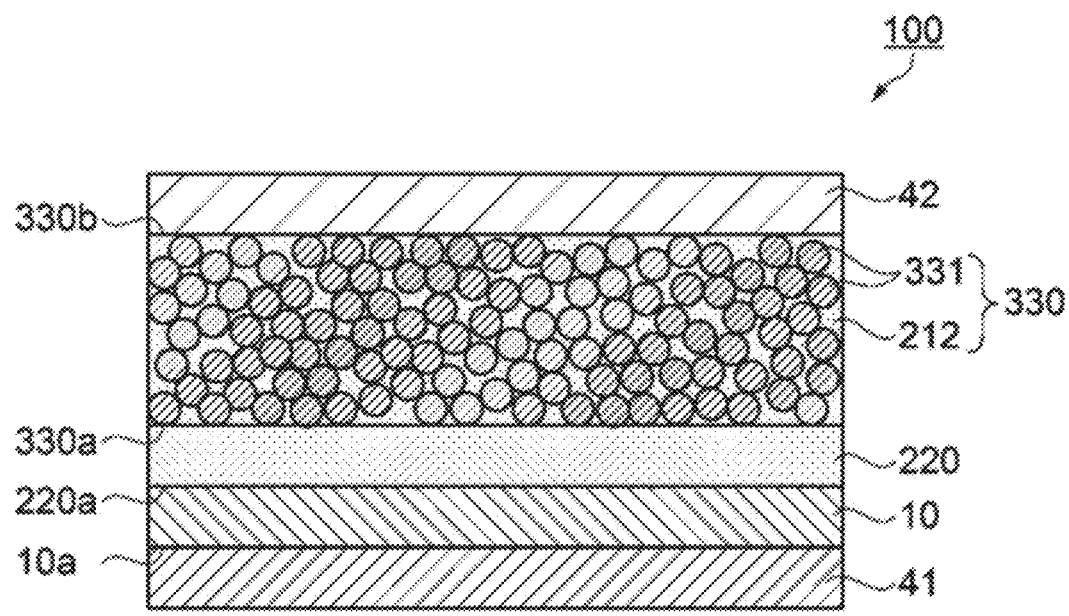
FIG. 5 is a schematic cross-sectional view illustrating a structure of a lithium ion battery that is the secondary battery according to the third embodiment.

FIG. 4 is a schematic perspective view illustrating a configuration of a lithium ion battery that is the secondary battery according to the third embodiment, while FIG. 5 is a schematic cross-sectional view illustrating a structure of a lithium ion battery that is the secondary battery according to the third embodiment.

In the description below, the secondary battery according to the third embodiment will be described with reference to these drawings with a focus on differences from the embodiments described above, and descriptions of similar matters will be omitted.

As illustrated in FIG. 4, a lithium ion battery 100 that is the secondary battery according to the third embodiment includes a cathode 10, an electrolyte layer 220, and an anode mixture 330 that functions as an anode, the electrolyte layer 220 and the anode mixture 330 being stacked sequentially at the cathode mixture 210. Furthermore, the lithium ion battery 100 has a current collector 41 and a current collector 42. The current collector 41 is provided on the side of a surface of the cathode 10 that is opposite to the surface of the cathode 10 facing the electrolyte layer 220, the current collector 41 being in contact with the cathode 10. The current collector 42 is provided on the side of a surface of the anode mixture 330 that is opposite to the surface of the anode mixture 330 facing the electrolyte layer 220, the current collector 42 being in contact with the anode mixture 330.

The anode mixture 330, which is different from the configurations of the lithium ion batteries 100 according to the embodiments described above, will be described below.

4-3-1 Anode Mixture

As illustrated in FIG. 5, the anode mixture 330 in the lithium ion battery 100 of the third embodiment includes a particulate anode active material 331 and a solid electrolyte 212. In such an anode mixture 330, the interfacial surface area between the particulate anode active material 331 and the solid electrolyte 212 is increased, and the battery reaction speed of the lithium ion battery 100 can be further increased.

An average particle size of the anode active material 331 is not limited, but is preferably from 0.1 μm to 150 μm, more preferably from 0.3 μm to 60 μm.

Satisfying such a range facilitates the realization of both an actual capacity density that is close to a theoretical capacity of the anode active material 331 and a high charge and discharge rate.

A particle size distribution of the anode active material 331 is not limited, and, for example, in a particle size distribution with one peak, the half-value width of the peak can be from 0.1 μm to 18 μm. Furthermore, a number of peaks in the particle size distribution of the anode active material 331 may be two or more.

Note that in FIG. 5, the shape of the particulate anode active material 331 is illustrated as a spherical shape, but a shape of the anode active material 331 is not limited to a spherical shape. For example, the anode active material 331 may take a variety of shapes, such as a column shape, a disk shape, a scaly shape, a hollow shape, and an amorphous shape, and may take two or more of these shapes in combination.

Examples of a constituent material of the anode active material 331 can be the same as those listed as a constituent material of the anode 30 of the first embodiment described above.

In the third embodiment, the anode mixture 330 includes the solid electrolyte 212 in addition to the anode active material 331 described above. The solid electrolyte 212 is present in a manner of filling in the gaps between the particles of the anode active material 331 or contacting, in particular, adhering, to a surface of the anode active material 331.

The solid electrolyte 212 is composed of a material including the aforementioned solid electrolyte according to an embodiment of the present disclosure.

As a result, the solid electrolyte 212 has outstanding lithium ion conductivity. Furthermore, the solid electrolyte 212 has excellent adhesiveness to the anode active material 331 and the electrolyte layer 220. As such, the lithium ion battery 100 as a whole can have particularly excellent property and reliability.

A content of the anode active material 331 in the anode mixture 330, represented by XB [mass %], and a content of the solid electrolyte 212 in the anode mixture 330, represented by XS [mass %], satisfy one of the following relationships, listed in an order of increasing preference: $0.14 \leq XS/XB \leq 26$, $0.44 \leq XS/XB \leq 4.1$, or $0.89 \leq XS/XB \leq 2.1$.

In addition, the anode mixture 330 may include a conductivity aid, a binder, or the like in addition to the anode active material 331 and the solid electrolyte 212.

However, a content of a component that is not the anode active material 331 or the solid electrolyte 212 in the anode mixture 330 is preferably 10 mass % or less, more preferably 7 mass % or less, and even more preferably 5 mass % or less.

Any conductor may be used as the conductivity aid as long as the electrochemical interaction at the cathode reaction potential can be ignored. More specifically, examples of the conductivity aid include: a carbon material such as acetylene black, ketjen black, and carbon nanotubes; a noble metal such as palladium and platinum; and a conductive oxide such as $SnO_2$, ZnO, $RuO_2$, $ReO_3$, and $Ir_2O_3$.

A thickness of the anode mixture 330 is not limited, but is preferably from 0.1 μm to 500 μm, more preferably from 0.3 μm to 100 μm.

4-4 Secondary Battery of Fourth Embodiment

A secondary battery according to a fourth embodiment will be described below.

Figure 6:
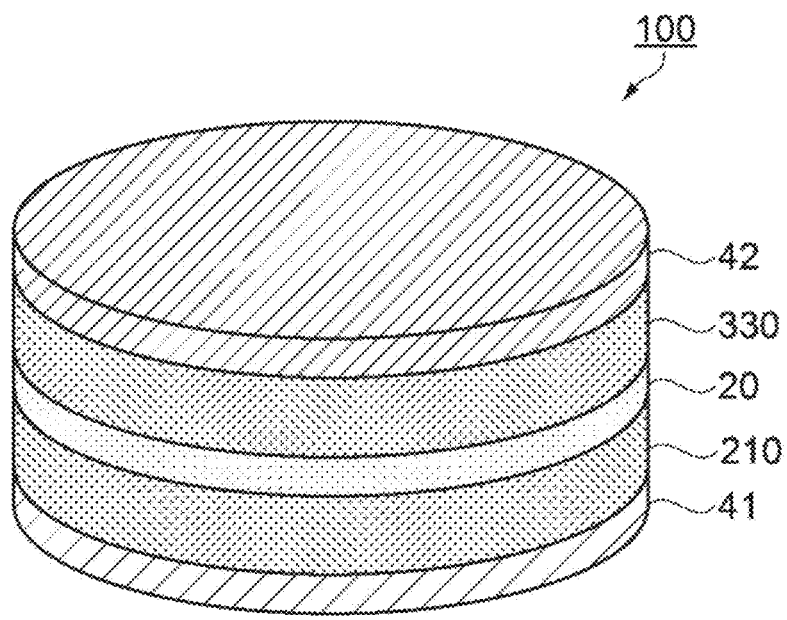
FIG. 6 is a schematic perspective view illustrating a configuration of a lithium ion battery that is a secondary battery according to a fourth embodiment.
Figure 7:
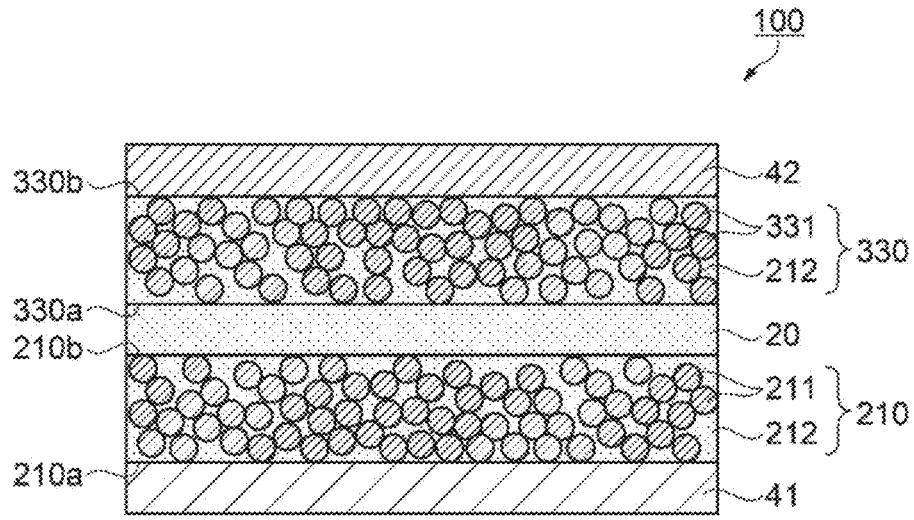
FIG. 7 is a schematic cross-sectional view illustrating a structure of a lithium ion battery that is the secondary battery according to the fourth embodiment.

FIG. 6 is a schematic perspective view illustrating a configuration of a lithium ion battery that is the secondary battery according to the fourth embodiment, while FIG. 7 is a schematic cross-sectional view illustrating a structure of a lithium ion battery that is the secondary battery according to the fourth embodiment.

In the description below, the secondary battery according to the fourth embodiment will be described with reference to these drawings with a focus on differences from the embodiments described above, and descriptions of similar matters will be omitted.

As illustrated in FIG. 6, a lithium ion battery 100 that is the secondary battery according to the fourth embodiment includes a cathode mixture 210, a solid electrolyte layer 20, and an anode mixture 330, the solid electrolyte layer 20 and the anode mixture 330 being stacked sequentially at the cathode mixture 210. Furthermore, the lithium ion battery 100 has a current collector 41 and a current collector 42. The current collector 41 is provided on the side of a surface of the cathode mixture 210 that is opposite to the surface of the cathode mixture 210 facing the solid electrolyte layer 20, the current collector 41 being in contact with the cathode mixture 210. The current collector 42 is provided on the side of a surface of the anode mixture 330 that is opposite to the surface of the anode mixture 330 facing the solid electrolyte layer 20, the current collector 42 being in contact with the anode mixture 330.

Each of these parts preferably satisfies the same conditions described for each of the corresponding parts in the embodiments described above.

Note that, in the first to fourth embodiments, another layer may be provided between the layers constituting the lithium ion battery 100 or provided at a surface of a layer constituting the lithium ion battery 100. Examples of such a layer include an adhesive layer, an insulating layer, and a protective layer.

5 Method for Producing Secondary Battery

Next, a method for producing the aforementioned secondary battery will be described.

5-1 Method for Producing Secondary Battery of First Embodiment

A method for producing the secondary battery according to the first embodiment will be described below.

Figure 8:
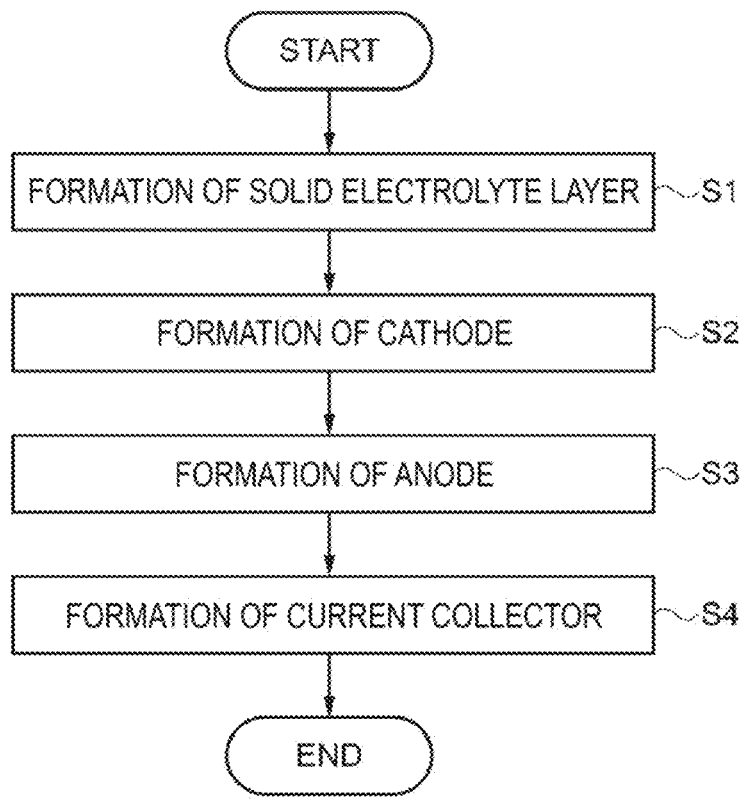
FIG. 8 is a flowchart illustrating a method for producing a lithium ion battery that is the secondary battery according to the first embodiment.
Figure 9:
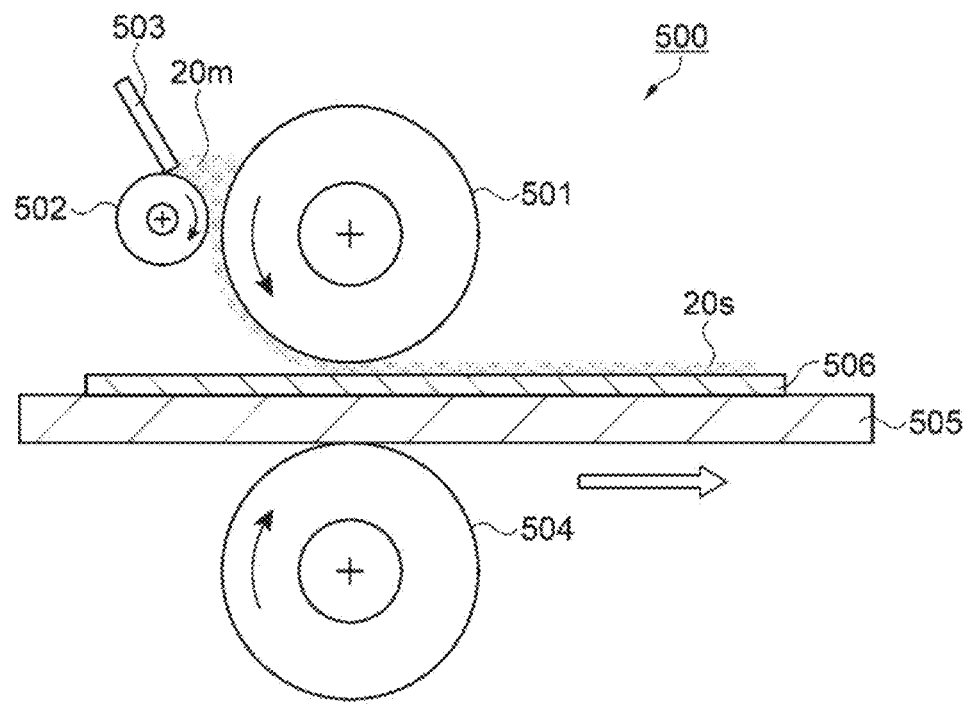
FIG. 9 is a schematic view illustrating the method for producing a lithium ion battery that is the secondary battery according to the first embodiment.
Figure 10:
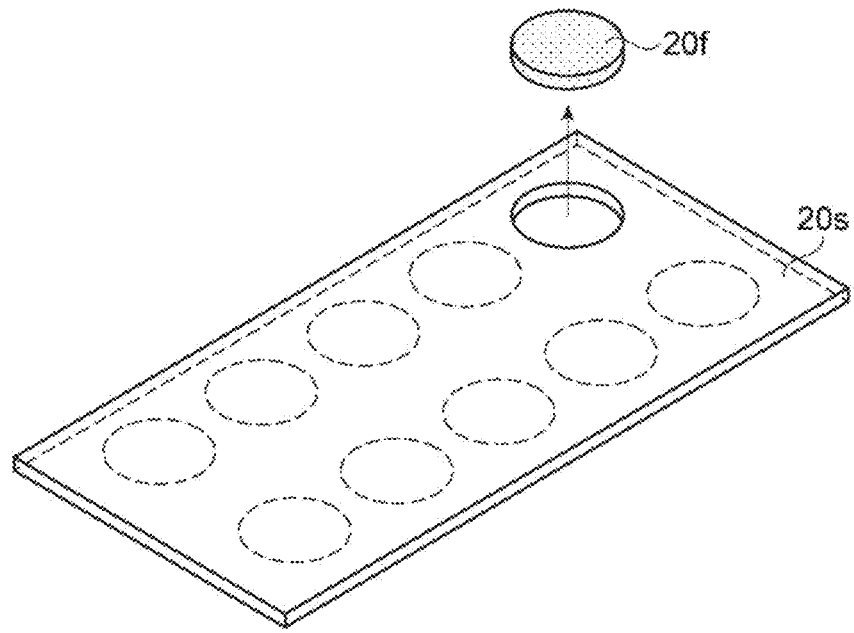
FIG. 10 is a schematic view illustrating the method for producing a lithium ion battery that is the secondary battery according to the first embodiment.
Figure 11:
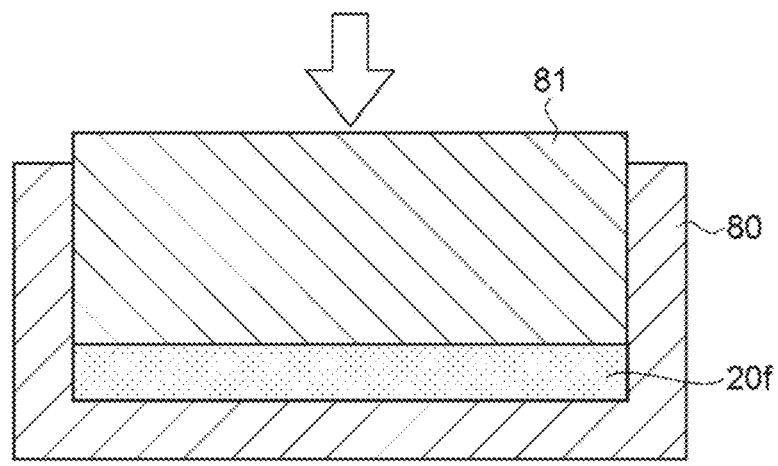
FIG. 11 is a schematic cross-sectional view illustrating another method for forming a solid electrolyte layer.

FIG. 8 is a flowchart illustrating a method for producing a lithium ion battery that is the secondary battery according to the first embodiment. FIGS. 9 and 10 are schematic views illustrating a method for producing a lithium ion battery that is the secondary battery according to the first embodiment. FIG. 11 is a schematic cross-sectional view illustrating another method for forming a solid electrolyte layer.

As illustrated in FIG. 8, the method for producing the lithium ion battery 100 of the first embodiment includes Step S1, Step S2, Step S3, and Step S4.

Step S1 is a step of forming the solid electrolyte layer 20. Step S2 is a step of forming the cathode 10. Step S3 is a step of forming the anode 30. Step S4 is a step of forming the current collectors 41 and 42.

5-1-1 Step S1

According to step S1, the step of forming the solid electrolyte layer 20, the solid electrolyte layer 20 is formed by, for example, a green sheet method, using the aforementioned calcined body according to an embodiment of the present disclosure, that is, a calcined body including a precursor oxide and an oxoacid compound. More specifically, the solid electrolyte layer 20 can be formed according to the following description.

First, a solution in which a binder such as polypropylene carbonate is dissolved in a solvent such as 1,4-dioxane is prepared. The solution is then mixed with the calcined body according to an embodiment of the present disclosure to obtain a slurry 20m. If necessary, a dispersant, a diluent, a humectant, and the like may be additionally used to prepare the slurry 20m.

Next, a solid electrolyte-forming sheet 20s is formed using the slurry 20m. More specifically, as illustrated in FIG. 9, for example, the solid electrolyte-forming sheet 20s is formed by applying the slurry 20m at a predetermined thickness onto a substrate 506 such as a polyethylene terephthalate film using an automatic film applicator 500. The automatic film applicator 500 has an application roller 501 and a doctor roller 502. A squeegee 503 is provided in such a manner that the squeegee 503 is in contact with the doctor roller 502 from above the doctor roller 502. A transport roller 504 is provided at a position facing the lower part of the application roller 501. A stage 505, on which the substrate 506 is placed, is inserted between the application roller 501 and the transport roller 504 and thereby, transported in a certain direction. The application roller 501 and the doctor roller 502 are arranged in the transport direction of the stage 505 with a gap between the application roller 501 and the doctor roller 502. The slurry 20m is fed from between the application roller 501 and the doctor roller 502 from the side provided with the squeegee 503. The application roller 501 and the doctor roller 502 are rotated to extrude the slurry 20m downward from the gap, and the surface of the application roller 501 is coated with a predetermined thickness of the slurry 20m. At the same time, the transfer roller 504 is rotated to transport the stage 505 in such a manner that the substrate 506 is in contact with the application roller 501 coated with the slurry 20m. As such, the slurry 20m applied to the application roller 501 is transferred to the substrate 506 in a sheet shape, resulting in the solid electrolyte-forming sheet 20s.

Thereafter, the solvent is removed from the solid electrolyte-forming sheet 20s formed at the substrate 506, and the solid electrolyte-forming sheet 20s is peeled from the substrate 506. Then, as illustrated in FIG. 10, a piece of the solid electrolyte-forming sheet 20s having a predetermined size is cut out using a cutting die, resulting in a molded product 20f.

Following that, the molded product 20f is subjected to a heating step at a temperature of from 700° C. to 1000° C. to produce the solid electrolyte layer 20 as a fired body. The heating time and atmosphere in the heating step are as described above.

Note that, in order to have a fired solid electrolyte layer 20 with a sintered density of 90% or greater, the slurry 20m may be extruded under pressure by the application roller 501 and the doctor roller 502 to form a solid electrolyte-forming sheet 20s having a predetermined thickness.

5-1-2 Step S2

After Step S1, the process proceeds to Step S2.

In Step S2, the step of forming the cathode 10, the cathode 10 is formed at one surface of the solid electrolyte layer 20. More specifically, for example, first, a $LiCoO_2$ layer is formed at a surface of the solid electrolyte layer 20 by sputtering a $LiCoO_2$ target in an inert gas, such as argon gas, using a sputtering device. Thereafter, the $LiCoO_2$ layer formed at the solid electrolyte layer 20 can be fired in an oxidizing atmosphere to convert crystals of the $LiCoO_2$ layer into high temperature phase crystals, resulting in a $LiCoO_2$ layer that is the cathode 10. The firing conditions of the LiCoO$_2$ layer are not limited, but a heating temperature can be set to from 400° C. to 600° C., and a heating time can be set to from 1 hour to 3 hours.

5-1-3 Step S3

After Step S2, the process proceeds to Step S3.

In Step S3, the step of forming the anode 30, the anode 30 is formed at the other surface of the solid electrolyte layer 20, that is, the surface on the opposite side to the surface at which the cathode 10 is formed. More specifically, for example, the anode 30 can be formed as a thin film of metal Li using a vacuum deposition apparatus or the like at the surface of the solid electrolyte layer 20 that is on the opposite side to the surface at which the cathode 10 is formed. The thickness of the anode 30 can be, for example, from 0.1 μm to 500 μm.

5-1-4 Step S4

After Step S3, the process proceeds to Step S4.

In Step S4, the step of forming the current collectors 41 and 42, the current collector 41 is formed in such a manner that the current collector 41 is in contact with the cathode 10, and the current collector 42 is formed in such a manner that the current collector 42 is in contact with the anode 30. More specifically, the current collector 41 can be formed by, for example, pressing a piece of aluminum foil cut into a round shape by die cutting onto the cathode 10 to join the round aluminum foil with the cathode 10. In addition, for example, the current collector 42 can be formed by pressing a piece of copper foil cut into a round shape by die cutting onto the anode 30 to join the round copper foil with the anode 30. The thickness of the current collectors 41 and 42 is not limited, but can be, for example, from 10 μm to 60 μm. Note that in this step, it may be that only one of the current collectors 41 and 42 is formed.

Note that the method for forming the solid electrolyte layer 20 is not limited to the green sheet method described in Step S1. For example, the following method can be employed as another method for forming the solid electrolyte layer 20. Specifically, as illustrated in FIG. 11, a molded product 20f can be obtained by uniaxial pressing, which includes filling a pellet die 80 with a powdered calcined body according to an embodiment of the present disclosure, that is, a calcined body containing a precursor oxide and an oxoacid compound, enclosing the powdered calcined body using a cap 81, and pressing the cap 81. The subsequent processing of the molded product 20f can be performed in the same manner as described above. A pellet die provided with an exhaust port that is not illustrated may be suitably used as the pellet die 80.

5-2 Method for Producing Secondary Battery of Second Embodiment

A method for producing the secondary battery according to the second embodiment will be described below.

Figure 12:
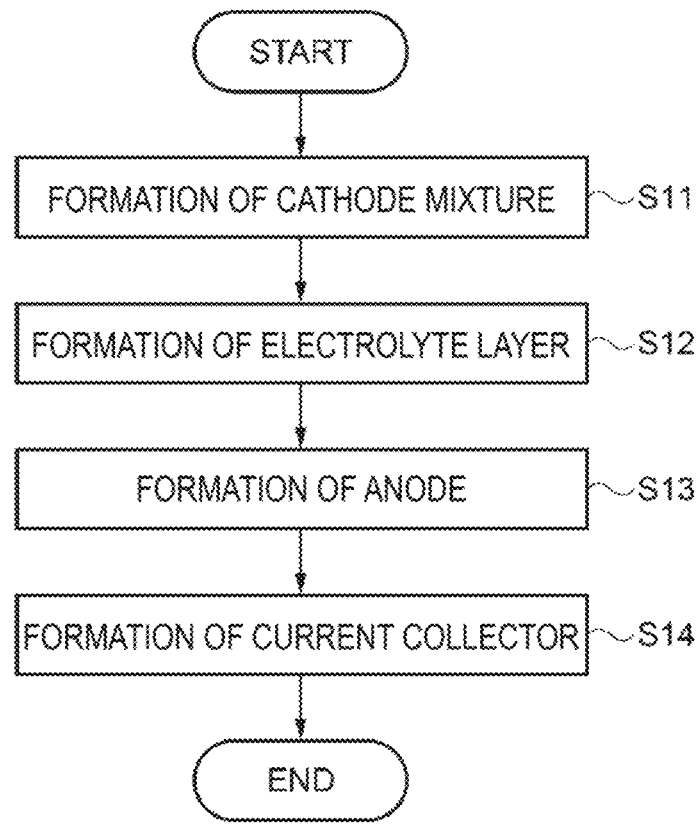
FIG. 12 is a flowchart illustrating a method for producing a lithium ion battery that is the secondary battery according to the second embodiment.
Figure 13:
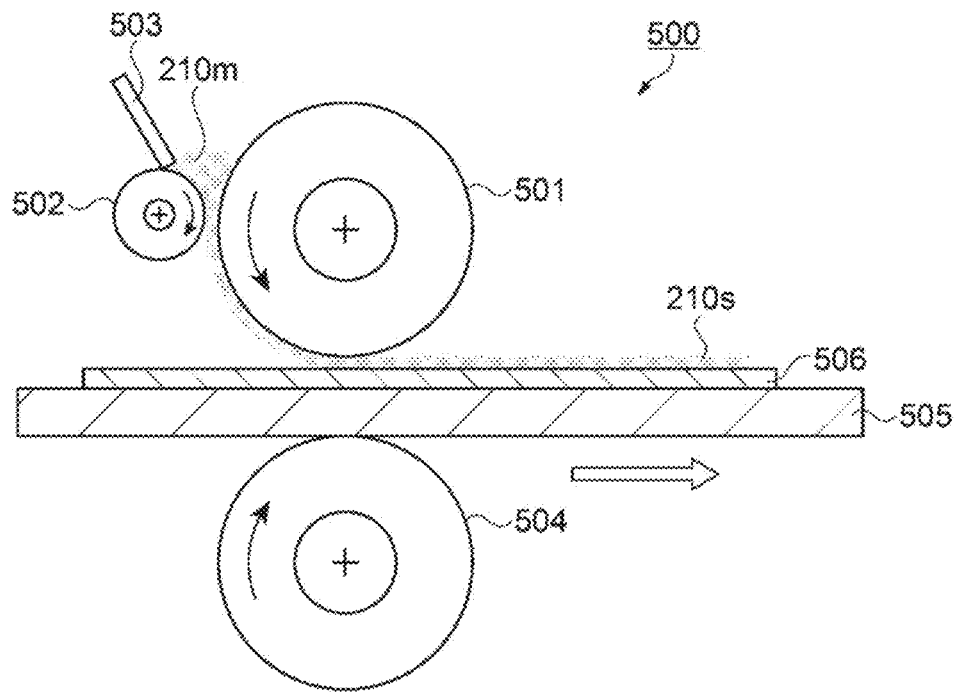
FIG. 13 is a schematic view illustrating the method for producing a lithium ion battery that is the secondary battery according to the second embodiment.
Figure 14:
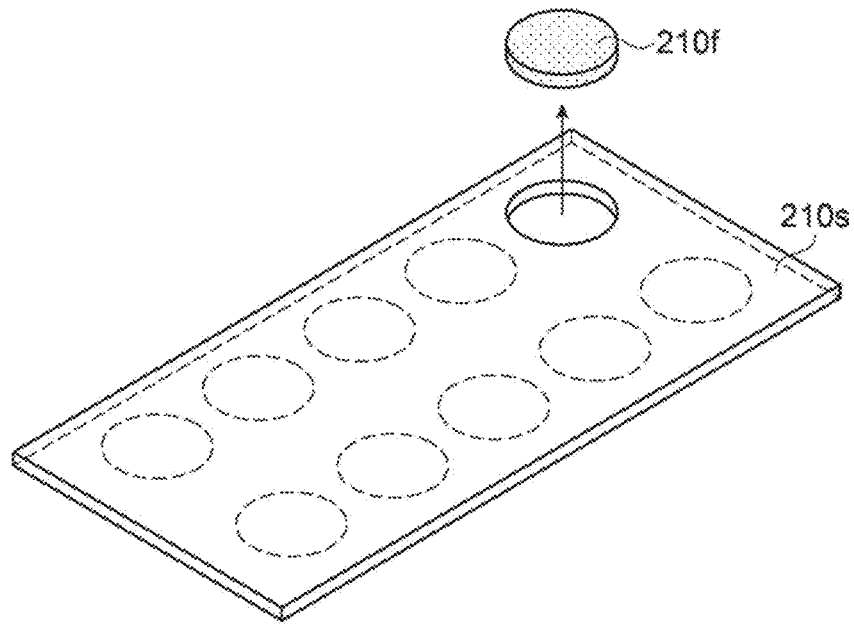
FIG. 14 is a schematic view illustrating the method for producing a lithium ion battery that is the secondary battery according to the second embodiment.

FIG. 12 is a flowchart illustrating a method for producing a lithium ion battery that is the secondary battery according to the second embodiment. FIGS. 13 and 14 are schematic views illustrating a method for producing a lithium ion battery that is the secondary battery according to the second embodiment.

In the description below, a method for producing the secondary battery according to the second embodiment will be described with reference to these drawings with a focus on differences from the embodiment described above, and descriptions of similar matters will be omitted.

As illustrated in FIG. 12, the method for producing the lithium ion battery 100 of the second embodiment includes Step S11, Step S12, Step S13, and Step S14.

Step S11 is a step of forming the cathode mixture 210. Step S12 is a step of forming the electrolyte layer 220. Step S13 is a step of forming the anode 30. Step S14 is a step of forming the current collectors 41 and 42.

5-2-1 Step S11

In Step S11, the step of forming the cathode mixture 210, the cathode mixture 210 is formed.

The cathode mixture 210 can be formed according to the following description.

Specifically, for example, first, a slurry 210m is obtained as a mixture of a cathode active material 211 such as LiCoO$_2$, the aforementioned calcined body according to an embodiment of the present disclosure, that is, a calcined body containing a precursor oxide and an oxoacid compound, a binder such as polypropylene carbonate, and a solvent such as 1,4-dioxane. If necessary, a dispersant, a diluent, a humectant, and the like may be additionally used to prepare the slurry 210m.

Next, a cathode mixture-forming sheet 210s is formed using the slurry 210m. More specifically, as illustrated in FIG. 13, for example, the cathode mixture-forming sheet 210s is formed by applying the slurry 210m at a predetermined thickness onto a substrate 506 such as a polyethylene terephthalate film using an automatic film applicator 500.

Thereafter, the solvent is removed from the cathode mixture-forming sheet 210s formed at the substrate 506, and the cathode mixture-forming sheet 210s is peeled from the substrate 506. Then, as illustrated in FIG. 14, a piece of the cathode mixture-forming sheet 210s having a predetermined size is cut out using a cutting die, resulting in a molded product 210f.

Following that, the molded product 210f is subjected to a heating step at a temperature of from 700° C. to 1000° C. to produce a cathode mixture 210 including a solid electrolyte. The heating time and atmosphere in the heating step are as described above.

5-2-2 Step S12

After Step S11, the process proceeds to Step S12.

In Step S12, the step of forming the electrolyte layer 220, the electrolyte layer 220 is formed at a surface 210b that is on one side of the cathode mixture 210. More specifically, for example, a LiCoO$_2$ layer is formed at a surface of the cathode mixture 210 by sputtering a LiCoO$_2$ target in an inert gas, such as argon gas, using a sputtering device. Thereafter, the LiCoO$_2$ layer formed at the cathode mixture 210 can be fired in an oxidizing atmosphere to convert crystals of the LiCoO$_2$ layer into high temperature phase crystals, resulting in a LiCoO$_2$ layer that is the electrolyte layer 220. The firing conditions of the LiCoO$_2$ layer are not limited, but a heating temperature can be set to from 400° C. to 600° C., and a heating time can be set to from 1 hour to 3 hours.

5-2-3 Step S13

After Step S12, the process proceeds to Step S13.

In Step S13, the step of forming the anode 30, the anode 30 is formed on the side of a surface of the electrolyte layer 220 that is opposite to the surface of the electrolyte layer 220 facing the cathode mixture 210. More specifically, for example, the anode 30 can be formed as a thin film of metal Li on the side of a surface of the electrolyte layer 220 that is opposite to the surface of the electrolyte layer 220 facing the cathode mixture 210 using a vacuum deposition apparatus or the like.

5-2-4 Step S14

After Step S13, the process proceeds to Step S14.

In Step S14, the step of forming the current collectors 41 and 42, the current collector 41 is formed in such a manner that the current collector 41 is in contact with the other surface of the cathode mixture 210, that is, a surface 210a on the opposite side to the surface 210b at which the electrolyte layer 220 is formed; meanwhile, the current collector 42 in formed in such a manner that the current collector 42 is in contact with the anode 30.

Note that the method for forming the cathode mixture 210 and the electrolyte layer 220 is not limited to the method described above. For example, the cathode mixture 210 and the electrolyte layer 220 may be formed as follows. Specifically, first, a slurry is obtained as a mixture of: the calcined body according to an embodiment of the present disclosure, that is, a calcined body containing a precursor oxide and an oxoacid compound; a binder; and a solvent. The obtained slurry is then introduced into an automatic film applicator 500 and applied on a substrate 506 to form an electrolyte-forming sheet. Thereafter, pressure is applied to the electrolyte-forming sheet and the cathode mixture-forming sheet 210s, the latter formed in the same manner as described above, that are stacked together to bond them together. Thereafter, the laminated sheet obtained by bonding may be die-cut into a molded product, and then the molded product may be fired in an oxidizing atmosphere to obtain a laminate of the cathode mixture 210 and the electrolyte layer 220.

5-3 Method for Producing Secondary Battery of Third Embodiment

A method for producing the secondary battery according to the third embodiment will be described below.

Figure 15:
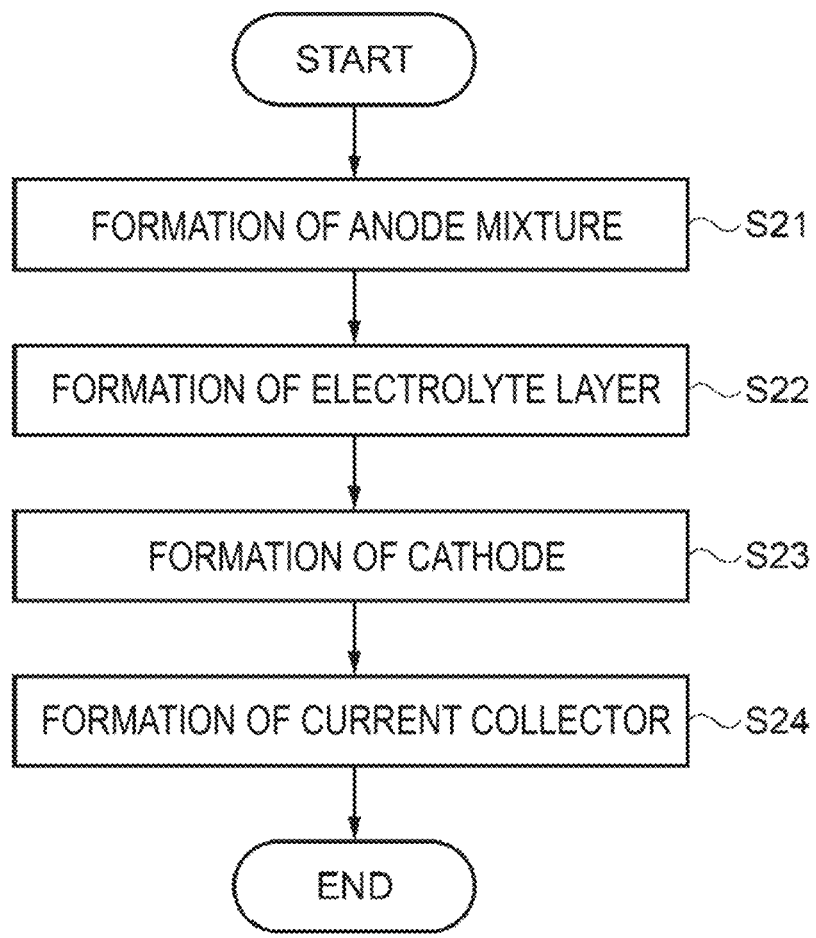
FIG. 15 is a flowchart illustrating a method for producing a lithium ion battery that is the secondary battery according to the third embodiment.
Figure 16:
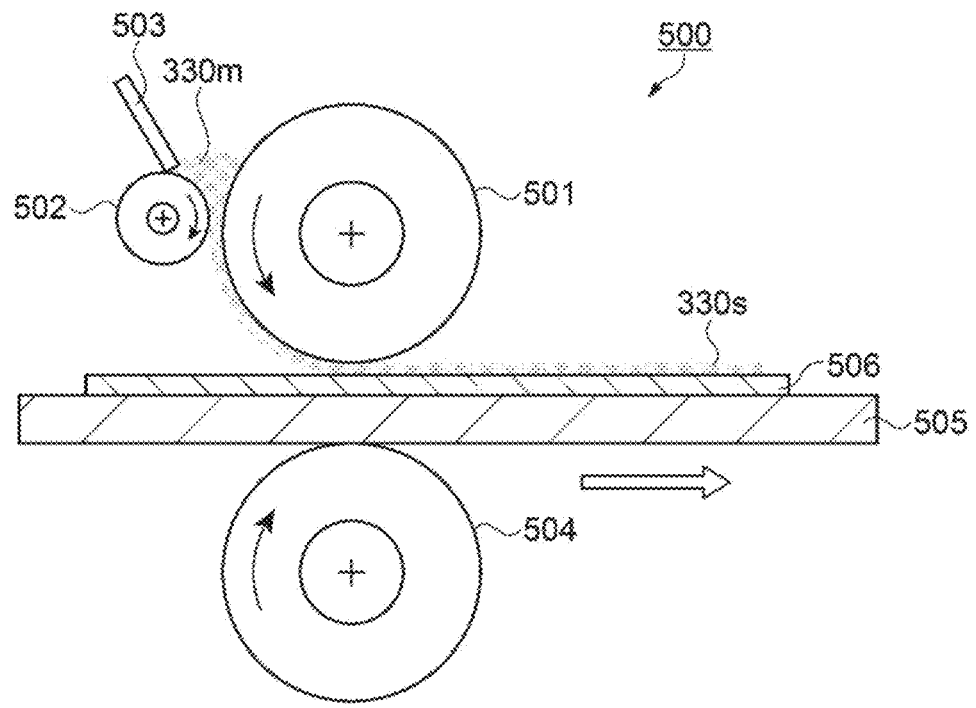
FIG. 16 is a schematic view illustrating the method for producing a lithium ion battery that is the secondary battery according to the third embodiment.
Figure 17:
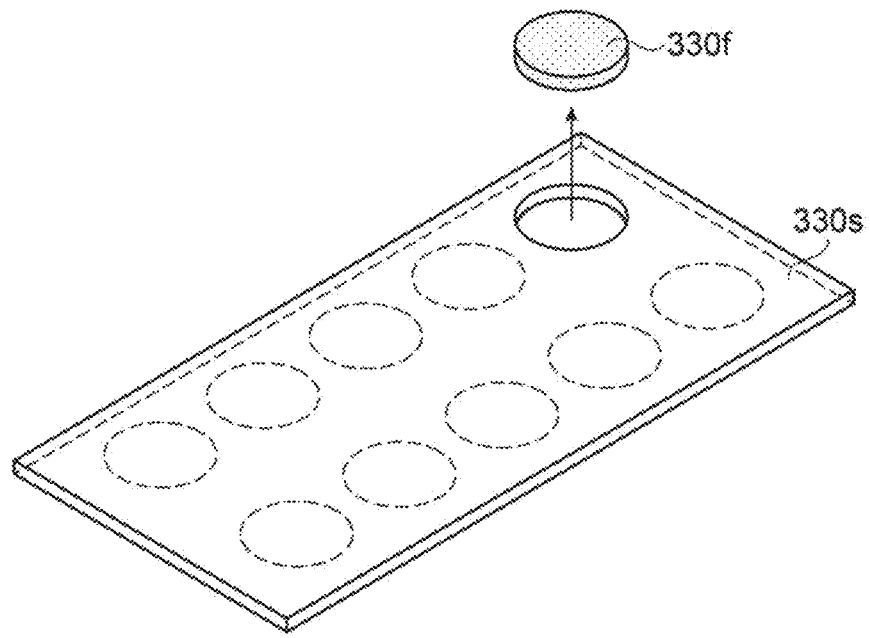
FIG. 17 is a schematic view illustrating the method for producing a lithium ion battery that is the secondary battery according to the third embodiment.

FIG. 15 is a flowchart illustrating a method for producing a lithium ion battery that is the secondary battery according to the third embodiment. FIGS. 16 and 17 are schematic views illustrating a method for producing a lithium ion battery that is the secondary battery according to the third embodiment.

In the description below, a method for producing the secondary battery according to the third embodiment will be described with reference to these drawings with a focus on differences from the embodiments described above, and descriptions of similar matters will be omitted.

As illustrated in FIG. 15, the method for producing the lithium ion battery 100 of the third embodiment includes Step S21, Step S22, Step S23, and Step S24.

Step S21 is a step of forming the anode mixture 330. Step S22 is a step of forming the electrolyte layer 220. Step S23 is a step of forming the cathode 10. Step S24 is a step of forming the current collectors 41 and 42.

5-3-1 Step S21

In Step S21, the step of forming the anode mixture 330, the anode mixture 330 is formed.

The anode mixture 330 can be formed according to the following description.

Specifically, for example, first, a slurry 330m is obtained as a mixture of: an anode active material 331 such as $Li_4Ti_5O_{12}$; the calcined body according to an embodiment of the present disclosure, that is, a calcined body containing a precursor oxide and an oxoacid compound; a binder such as polypropylene carbonate; and a solvent such as 1,4-dioxane. If necessary, a dispersant, a diluent, a humectant, and the like may be additionally used to prepare the slurry 330m.

Next, an anode mixture-forming sheet 330s is formed using the slurry 330m. More specifically, as illustrated in FIG. 16, for example, the anode mixture-forming sheet 330s is formed by applying the slurry 330m at a predetermined thickness onto a substrate 506 such as a polyethylene terephthalate film using an automatic film applicator 500.

Thereafter, the solvent is removed from the anode mixture-forming sheet 330s formed at the substrate 506, and the anode mixture-forming sheet 330s is peeled from the substrate 506. Then, as illustrated in FIG. 17, a piece of the anode mixture-forming sheet 330s having a predetermined size is cut out using a cutting die, resulting in a molded product 330f.

Following that, the molded product 330f is subjected to a heating step at a temperature of from 700° C. to 1000° C. to produce an anode mixture 330 including a solid electrolyte. The heating time and atmosphere in the heating step are as described above.

5-3-2 Step S22

After Step S21, the process proceeds to Step S22.

In Step S22, the step of forming the electrolyte layer 220, the electrolyte layer 220 is formed at a surface 330a that is on one side of the anode mixture 330. More specifically, for example, a $Li_{2.2}C_{0.8}B_{0.2}O_3$ layer is formed at a surface of the anode mixture 330 by sputtering a $Li_{2.2}C_{0.8}B_{0.2}O_3$ target, $Li_{2.2}C_{0.8}B_{0.2}O_3$ being a solid solution of $Li_2CO_3$ and $Li_3BO_3$, in an inert gas, such as argon gas, using a sputtering device. Thereafter, the $Li_{2.2}C_{0.8}B_{0.2}O_3$ layer formed at the anode mixture 330 can be fired in an oxidizing atmosphere to convert crystals of the $Li_{2.2}C_{0.8}B_{0.2}O_3$ layer into high temperature phase crystals, resulting in a $Li_{2.2}C_{0.8}B_{0.2}O_3$ layer that is the electrolyte layer 220. The firing conditions of the $Li_{2.2}C_{0.8}B_{0.2}O_3$ layer are not limited, but a heating temperature can be set to from 400° C. to 600° C., and a heating time can be set to from 1 hour to 3 hours.

5-3-3 Step S23

After Step S22, the process proceeds to Step S23.

In Step S23, the step of forming the cathode 10, the cathode 10 is formed on the side of a surface 220a of the electrolyte layer 220, that is, on the side of the surface of the electrolyte layer 220 that is opposite to the surface of the electrolyte layer 220 facing the anode mixture 330. More specifically, for example, first, a $LiCoO_2$ layer is formed at the surface 220a that is on one side of the electrolyte layer 220 using a vacuum deposition apparatus or the like. Thereafter, a laminate of the electrolyte layer 220 at which the $LiCoO_2$ layer is formed and the anode mixture 330 are fired to convert the crystals of the $LiCoO_2$ layer to high temperature phase crystals, resulting in a $LiCoO_2$ layer that is the cathode 10. The firing conditions of the $LiCoO_2$ layer are not limited, but a heating temperature can be set to from 400° C. to 600° C., and a heating time can be set to from 1 hour to 3 hours.

5-3-4 Step S24

After Step S23, the process proceeds to Step S24.

In Step S24, the step of forming the current collectors 41 and 42, the current collector 41 is formed in such a manner that the current collector 41 is in contact with a surface 10a that is on one side of the cathode 10, the surface 10a being on the opposite side to the surface at which the electrolyte layer 220 is formed; meanwhile, the current collector 42 is formed in such a manner that the current collector 42 is in contact with the other surface of the anode mixture 330, that is, a surface 330b that is on the other side to the surface 330a at which the electrolyte layer 220 is formed.

Note that the method for forming the anode mixture 330 and the electrolyte layer 220 is not limited to the method described above. For example, the anode mixture 330 and the electrolyte layer 220 may be formed as follows. Specifically, first, a slurry is obtained as a mixture of: the calcined body according to an embodiment of the present disclosure, that is, a calcined body containing a precursor oxide and an oxoacid compound; a binder; and a solvent.

The obtained slurry is then introduced into an automatic film applicator 500 and applied on a substrate 506 to form an electrolyte-forming sheet. Thereafter, pressure is applied to the electrolyte-forming sheet and the anode mixture-forming sheet 330s, the latter formed in the same manner as described above, that are stacked together to bond them together. Thereafter, the laminated sheet obtained by bonding may be die-cut into a molded product, and then the molded product may be fired in an oxidizing atmosphere to obtain a laminate of the anode mixture 330 and the electrolyte layer 220.

5-4 Method for Producing Secondary Battery of Fourth Embodiment

A method for producing the secondary battery according to the fourth embodiment will be described below.

Figure 18:
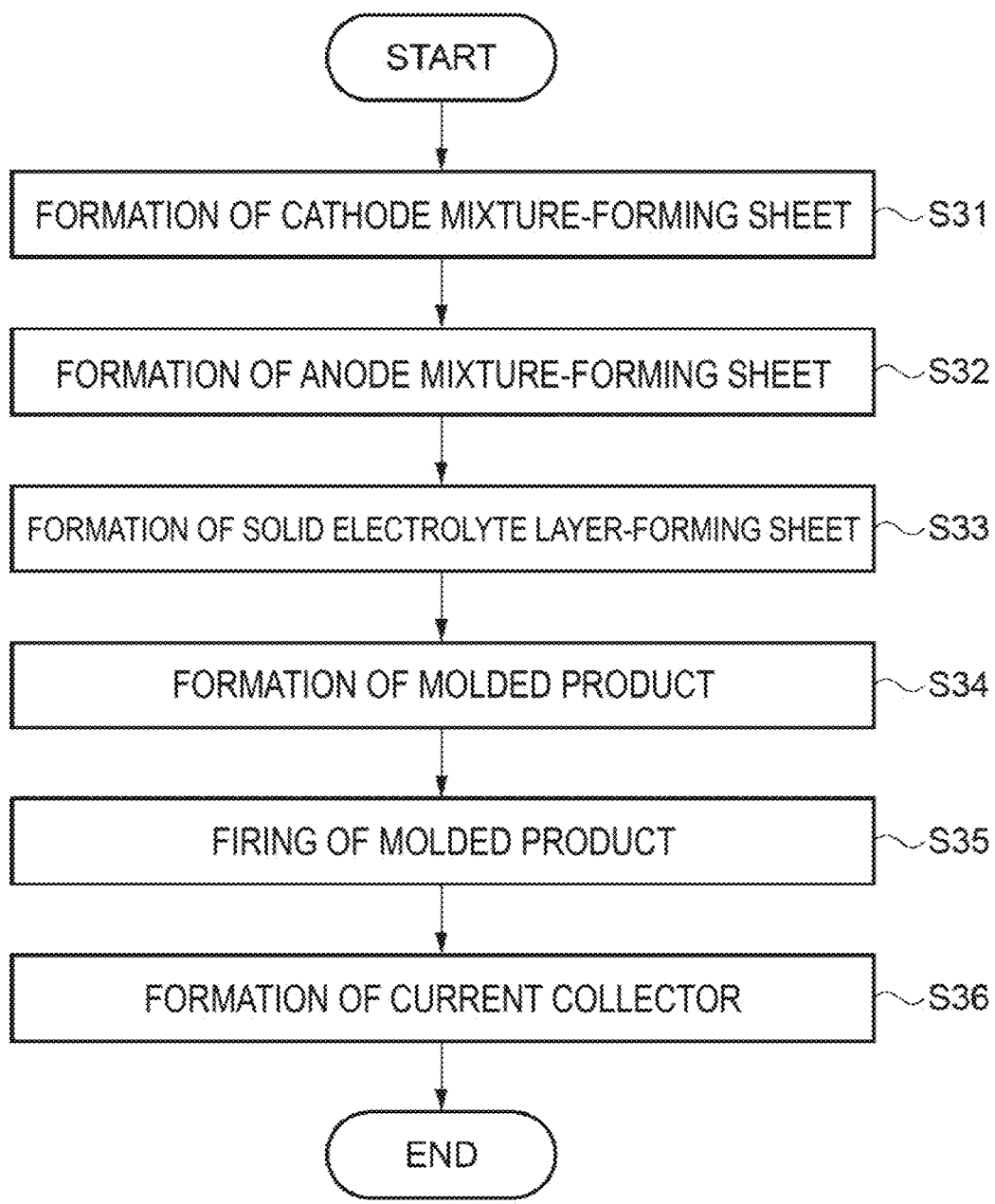
FIG. 18 is a flowchart illustrating a method for producing a lithium ion battery that is the secondary battery according to the fourth embodiment.
Figure 19:
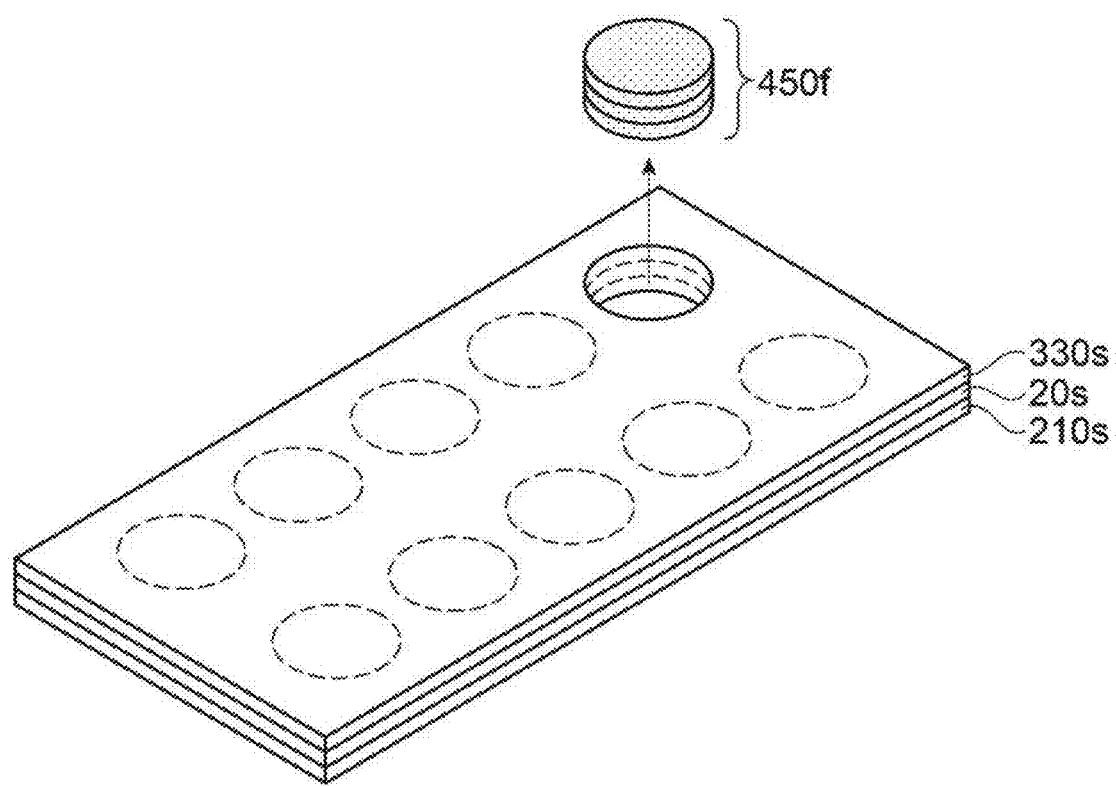
FIG. 19 is a schematic view illustrating the method for producing a lithium ion battery that is the secondary battery according to the fourth embodiment.

FIG. 18 is a flowchart illustrating a method for producing a lithium ion battery that is the secondary battery according to the fourth embodiment. FIG. 19 is a schematic view illustrating a method for producing a lithium ion battery that is the secondary battery according to the fourth embodiment.

In the description below, a method for producing the secondary battery according to the fourth embodiment will be described with reference to these drawings with a focus on differences from the embodiments described above, and descriptions of similar matters will be omitted.

As illustrated in FIG. 18, the method for producing the lithium ion battery 100 of the fourth embodiment includes Step S31, Step S32, Step S33, Step S34, Step S35, and Step S36.

Step S31 is a step of forming a sheet for forming the cathode mixture 210. Step S32 is a step of forming a sheet for forming the anode mixture 330. Step S33 is a step of forming a sheet for forming the solid electrolyte layer 20. Step S34 is a step of forming a molded product 450f, in which a laminate of the sheet for forming the cathode mixture 210, the sheet for forming the anode mixture 330, and the sheet for forming the solid electrolyte layer 20 is formed into a predetermined shape. Step S35 is a step of firing the molded product 450f. Step S36 is a step of forming the current collectors 41 and 42.

In the following description, Step S31 is first performed, followed by Step S32 and then Step S33. However, the order of performing Step S31, Step S32, and Step S33 is not limited to such order and may be changed, or the steps may be performed simultaneously.

5-4-1 Step S31

In Step S31, the step of forming a sheet for forming the cathode mixture 210, the sheet for forming the cathode mixture 210, that is, a cathode mixture-forming sheet 210s, is formed.

The cathode mixture-forming sheet 210s can be formed by, for example, the same method as the one described in the second embodiment.

Note that the cathode mixture-forming sheet 210s obtained in this step is preferably formed of a slurry 210m in which a solvent has been removed.

5-4-2 Step S32

After Step S31, the process proceeds to Step S32.

In Step S32, the step of forming a sheet for forming the anode mixture 330, the sheet for forming the anode mixture 330, that is, an anode mixture-forming sheet 330s, is formed.

The anode mixture-forming sheet 330s can be formed by, for example, the same method as the one described in the third embodiment.

Note that the anode mixture-forming sheet 330s obtained in this step is preferably formed of a slurry 330m in which a solvent has been removed.

5-4-3 Step S33

After Step S32, the process proceeds to Step S33.

In Step S33, the step of forming a sheet for forming the solid electrolyte layer 20, the sheet for forming the solid electrolyte layer 20, that is, a solid electrolyte-forming sheet 20s, is formed.

The solid electrolyte-forming sheet 20s can be formed by, for example, the same method as the one described in the first embodiment.

Note that the solid electrolyte-forming sheet 20s obtained in this step is preferably formed a slurry 20m in which a solvent has been removed.

5-4-4 Step S34

After Step S33, the process proceeds to Step S34.

In Step S34, the step of forming a molded product 450f, pressure is applied to the cathode mixture-forming sheet 210s, the solid electrolyte-forming sheet 20s, and the anode mixture-forming sheet 330s, stacked in this order, to bond the three sheets together. Thereafter, as illustrated in FIG. 19, the laminated sheet obtained by bonding is die-cut to obtain a molded product 450f.

5-4-5 Step S35

After Step S34, the process proceeds to Step S35.

In Step S35, the step of firing the molded product 450f, the molded product 450f is subjected to a heating step at a temperature of from 700° C. to 1000° C. As a result, the portion composed of the cathode mixture-forming sheet 210s becomes the cathode mixture 210, the portion composed of the solid electrolyte-forming sheet 20s becomes the solid electrolyte layer 20, and the portion composed of the anode mixture-forming sheet 330s becomes the anode mixture 330. In other words, a fired article of the molded product 450f is a laminate of the cathode mixture 210, the solid electrolyte layer 20, and the anode mixture 330. The heating time and atmosphere in the heating step are as described above.

5-4-6 Step S36

After Step S35, the process proceeds to Step S36.

In Step S36, the step of forming the current collectors 41 and 42, a current collector 41 is formed in such a manner that the current collector 41 is in contact with a surface 210a of the cathode mixture 210, and a current collector 42 is formed in such a manner that the current collector 42 is in contact with a surface 330b of the anode mixture 330.

The preferred embodiments of the present disclosure are as described above. However, the present disclosure is not limited to these embodiments.

For example, the method of producing a solid electrolyte may have another step in addition to the steps described above.

In addition, when an embodiment of the present disclosure is applied to a secondary battery, the configuration of the secondary battery is not limited to that of the embodiments described above.

For example, when an embodiment of the present disclosure is applied to a secondary battery, the secondary battery is not limited to a lithium ion battery, and may be, for example, a secondary battery in which a porous separator, impregnated with an electrolyte solution, is provided between a cathode mixture and an anode.

In addition, when an embodiment of the present disclosure is applied to a secondary battery, the method for producing the secondary battery is not limited to that of the embodiments described above. For example, the order of steps in the production of the secondary battery may be different from that of the embodiments described above.

Furthermore, in the embodiments described above, the solid electrolyte according to the present disclosure are described as a solid electrolyte constituting a part of a secondary battery, and in particular, a solid electrolyte constituting a part of an all-solid-state lithium secondary battery that is an all-solid-state secondary battery. However, the solid electrolyte according to the present disclosure may be, for example, a solid electrolyte constituting a part of something that is not an all-solid secondary battery, or a solid electrolyte constituting a part of something that is not a secondary battery.

EXAMPLES

Next, specific examples of the present disclosure will be described. Note that in the following description, "room temperature" refers to 25° C. Furthermore, processing and measurement were performed at 25° C. or one atmosphere of pressure, unless the condition of the temperature or the pressure was otherwise indicated.

6 Production of Calcined Bodys

First, the calcined bodys used to produce the corresponding solid electrolyte of each of the examples and the comparative examples described below were produced.

Metal compound solutions described below were used in the preparation of each of the calcined bodys.

6-1 Preparation of Metal Compound Solutions Used in the Production of Calcined bodys 6-1-1 Preparation of 2-Normal Butoxyethanol Solution of Lithium Nitrate To a 30 g Pyrex (Pyrex: a trademark of CORNING INCORPORATED. Pyrex is a registered trademark) reagent bottle containing a magnetic stir bar, 1.3789 g of lithium nitrate 3N5 with a purity of 99.95%, available from Kanto Chemical Co., Inc., and 18.6211 g of guaranteed reagent-grade 2-normal butoxyethanol (ethylene glycol monobutyl ether), available from Kanto Chemical Co., Inc., were weighed and place therein. Then, the reagent bottle was placed on a hot plate with a magnetic stirrer, and lithium nitrate was completely dissolved in 2-normal butoxyethanol with stirring at 170° C. for 1 hour. The mixture was gradually cooled to room temperature, resulting in a 2-normal butoxyethanol solution of lithium nitrate at a concentration of 1 mol/kg.

6-1-2 Preparation of 2-Normal Butoxyethanol Solution of Lanthanum Nitrate 8.6608 g of lanthanum nitrate hexahydrate 4N, available from Kanto Chemical Co., Inc., and 11.3392 g of guaranteed reagent-grade 2-normal butoxyethanol, available from Kanto Chemical Co., Inc., were weighed and placed into a 30 g Pyrex reagent bottle containing a magnetic stir bar. Then, the reagent bottle was placed on a hot plate with a magnetic stirrer, and lanthanum nitrate hexahydrate was completely dissolved in 2-normal butoxyethanol with stirring at 140° C. for 30 minutes. The mixture was gradually cooled to room temperature, resulting in a 2-normal butoxyethanol solution of lanthanum nitrate hexahydrate at a concentration of 1 mol/kg.

6-1-3 Preparation of 2-Normal Butoxyethanol Solution of Zirconium Tetranormal Butoxide 3.8368 g of zirconium tetranormal butoxide, available from Kojundo Chemical Laboratory Co., Ltd., and 6.1632 g of guaranteed reagent-grade 2-normal butoxyethanol, available from Kanto Chemical Co., Inc., were weighed and placed into a 20 g Pyrex reagent bottle containing a magnetic stir bar. Then, the reagent bottle was placed on a hot plate with a magnetic stirrer, and zirconium tetranormal butoxide was completely dissolved in 2-normal butoxyethanol with stirring at room temperature for 30 minutes, resulting in a 2-normal butoxyethanol solution of zirconium tetranormal butoxide at a concentration of 1 mol/kg.

6-1-4 Preparation of Aqueous Solution of Indium Nitrate 3.5488 g of 4N indium nitrate, hydrous (n=3) with a purity of 99.99%, available from Kojundo Chemical Laboratory Co., Ltd., and 6.4512 g of pure water were weighed and placed into a 30 g Pyrex reagent bottle containing a magnetic stir bar. Then, the reagent bottle was placed on a hot plate with a magnetic stirrer, and indium nitrate, hydrous was completely dissolved with stirring at 90° C. for 30 minutes, followed by gradual cooling to room temperature. This resulted in an aqueous solution of indium nitrate at a concentration of 1 mol/kg. Note that the hydration number n of indium nitrate, hydrous used to prepare the aqueous solution of indium nitrate was 3 from the result of mass loss by a combustion experiment.

6-1-5 Preparation of 2-Normal Butoxyethanol Solution of Niobium Pentaethoxide 3.1821 g of niobium pentaethoxide 4N, available from Kojundo Chemical Laboratory Co., Ltd., and 6.8179 g of guaranteed reagent-grade 2-normal butoxyethanol, available from Kanto Chemical Co., Inc., were weighed and placed into a 20 g Pyrex reagent bottle containing a magnetic stir bar. Then, the reagent bottle was placed on a hot plate with a magnetic stirrer, and niobium pentaethoxide was completely dissolved in 2-normal butoxyethanol with stirring at room temperature for 30 minutes, resulting in a 2-normal butoxyethanol solution of niobium pentaethoxide at a concentration of 1 mol/kg.

6-1-6 Preparation of 2-Normal Butoxyethanol Solution of Tantalum pentaethoxide 4.0626 g of tantalum pentaethoxide 5N, available from Kojundo Chemical Laboratory Co., Ltd., and 5.9374 g of guaranteed reagent-grade 2-normal butoxyethanol, available from Kanto Chemical Co., Inc., were weighed and placed into a 20 g Pyrex reagent bottle containing a magnetic stir bar. Then, the reagent bottle was placed on a hot plate with a magnetic stirrer, and tantalum pentaethoxide was completely dissolved in 2-normal butoxyethanol with stirring at room temperature for 30 minutes, resulting in a 2-normal butoxyethanol solution of tantalum pentaethoxide at a concentration of 1 mol/kg.

6-1-7 Preparation of 2-Normal Butoxyethanol Solution of Antimony Trinormal Butoxide 3.4110 g of antimony trinormal butoxide, available from FUJIFILM Wako Pure Chemical Corporation, and 6.5890 g of guaranteed reagent-grade 2-normal butoxyethanol, available from Kanto Chemical Co., Inc., were weighed and placed into a 20 g Pyrex reagent bottle containing a magnetic stir bar. Then, the reagent bottle was placed on a hot plate with a magnetic stirrer, and antimony trinormal butoxide was completely dissolved in 2-normal butoxyethanol with stirring at room temperature for 30 minutes, resulting in a 2-normal butoxyethanol solution of antimony trinormal butoxide at a concentration of 1 mol/kg.

6-2 Production of Calcined Bodys of Each Example and Comparative Example

The metal compound solutions obtained as described above were used to produce the corresponding calcined body of each of the examples and the comparative examples as follows.

Example 1

In Example 1, a calcined body used in the production of a solid electrolyte having a composition represented by $Li_{6.3}La_3(Zr_{1.25}In_{0.05}Sb_{0.50}Ta_{0.20})O_{12}$ was produced as follows.

First, 7.560 g of the 2-normal butoxyethanol solution of lithium nitrate prepared as described above, 3.000 g of the 2-normal butoxyethanol solution of lanthanum nitrate hexahydrate prepared as described above, 0.050 g of the aqueous solution of indium nitrate prepared as described above, and 2 mL of 2-normal butoxyethanol as an organic solvent were weighed and placed into a Pyrex reagent bottle. A magnetic stir bar was placed into the reagent bottle, which was then placed on a hot plate with a magnetic stirrer.

The hot plate was set to a temperature of 160° C. and a rotational speed of 500 rpm, and heating and stirring were performed for 30 minutes.

Then, another 2 mL of 2-normal butoxyethanol was added, and heating and stirring were performed again for 30 minutes.

Thereafter, another 2 mL of 2-normal butoxyethanol was added, and heating and stirring were performed again for 30 minutes.

Heating and stirring for 30 minutes were seen as one round of dehydration treatment, and as such, three rounds of dehydration treatment were performed in this example.

After the dehydration treatment, the reagent bottle was capped and sealed.

Then, stirring was performed with the hot plate set to a temperature of 25° C. and a rotational speed of 500 rpm, and the content of the reagent bottle was gradually cooled to room temperature.

Thereafter, the reagent bottle was transferred to a dry atmosphere, and 1.250 g of the 2-normal butoxyethanol solution of zirconium tetranormal butoxide, 0.500 g of the 2-normal butoxyethanol solution of antimony trinormal butoxide, and 0.200 g of the 2-normal butoxyethanol solution of tantalum pentaethoxide, all prepared as described above, were weighed and placed into the reagent bottle. A magnetic stir bar was then placed into the reagent bottle.

Stirring was then performed at room temperature for 30 minutes with the magnetic stirrer set at a rotational speed of 500 rpm, resulting in a precursor solution.

Next, the precursor solution was placed in a titanium Petri dish with an inner diameter of 50 mm and a height of 20 mm. The Petri dish containing the precursor solution was placed on the hot plate, and heating was performed for 1 hour with the hot plate set to a temperature of 160° C., followed by heating for 30 minutes with the hot plate set to a temperature of 180° C., thus removing the solvent.

Following that, heating was performed for 30 minutes with the hot plate set to a temperature of 360° C., decomposing most of the organic components contained in the content of the Petri dish by combustion.

Thereafter, heating was performed for 1 hour with the hot plate set to a temperature of 540° C., and the remaining organic components were combusted and decomposed. Then, the content of the Petri dish was gradually cooled to room temperature while the Petri dish was on the hot plate, resulting in a solid composition that is the calcined body.

Example 2

In Example 2, a calcined body used in the production of a solid electrolyte having a composition represented by $Li_{6.3}La_3(Zr_{1.15}In_{0.15}Sb_{0.50}Ta_{0.20})O_{12}$ was produced as follows.

First, 7.560 g of the 2-normal butoxyethanol solution of lithium nitrate prepared as described above, 3.000 g of the 2-normal butoxyethanol solution of lanthanum nitrate hexahydrate prepared as described above, 0.150 g of the aqueous solution of indium nitrate prepared as described above, and 2 mL of 2-normal butoxyethanol as an organic solvent were weighed and placed into a Pyrex reagent bottle. A magnetic stir bar was placed into the reagent bottle, which was then placed on a hot plate with a magnetic stirrer.

The hot plate was set to a temperature of 160° C. and a rotational speed of 500 rpm, and heating and stirring were performed for 30 minutes.

Then, another 2 mL of 2-normal butoxyethanol was added, and heating and stirring were performed again for 30 minutes.

Thereafter, another 2 mL of 2-normal butoxyethanol was added, and heating and stirring were performed again for 30 minutes.

Heating and stirring for 30 minutes were seen as one round of dehydration treatment, and as such, three rounds of dehydration treatment were performed in this example.

After the dehydration treatment, the reagent bottle was capped and sealed.

Then, stirring was performed with the hot plate set to a temperature of 25° C. and a rotational speed of 500 rpm, and the content of the reagent bottle was gradually cooled to room temperature.

Thereafter, the reagent bottle was transferred to a dry atmosphere, and 1.150 g of the 2-normal butoxyethanol solution of zirconium tetranormal butoxide, 0.500 g of the 2-normal butoxyethanol solution of antimony trinormal butoxide, and 0.200 g of the 2-normal butoxyethanol solution of tantalum pentaethoxide, all prepared as described above, were weighed and placed into the reagent bottle. A magnetic stir bar was then placed into the reagent bottle.

Stirring was then performed at room temperature for 30 minutes with the magnetic stirrer set at a rotational speed of 500 rpm, resulting in a precursor solution.

Next, the precursor solution was placed in a titanium Petri dish with an inner diameter of 50 mm and a height of 20 mm. The Petri dish containing the precursor solution was placed on the hot plate, and heating was performed for 1 hour with the hot plate set to a temperature of 160° C., followed by heating for 30 minutes with the hot plate set to a temperature of 180° C., thus removing the solvent.

Following that, heating was performed for 30 minutes with the hot plate set to a temperature of 360° C., decomposing most of the organic components contained in the content of the Petri dish by combustion.

Thereafter, heating was performed for 1 hour with the hot plate set to a temperature of 540° C., and the remaining organic components were combusted and decomposed. Then, the content of the Petri dish was gradually cooled to room temperature while the Petri dish was on the hot plate, resulting in a solid composition that is the calcined body.

Example 3

In Example 3, a calcined body used in the production of a solid electrolyte having a composition represented by $Li_{5.85}La_3(Zr_{0.70}In_{0.15}Nb_{0.25}Sb_{0.50}Ta_{0.40})O_{12}$ was produced as follows.

First, 7.020 g of the 2-normal butoxyethanol solution of lithium nitrate prepared as described above, 3.000 g of the 2-normal butoxyethanol solution of lanthanum nitrate hexahydrate prepared as described above, 0.150 g of the aqueous solution of indium nitrate prepared as described above, and 2 mL of 2-normal butoxyethanol as an organic solvent were weighed and placed into a Pyrex reagent bottle. A magnetic stir bar was placed into the reagent bottle, which was then placed on a hot plate with a magnetic stirrer.

The hot plate was set to a temperature of 160° C. and a rotational speed of 500 rpm, and heating and stirring were performed for 30 minutes.

Then, another 2 mL of 2-normal butoxyethanol was added, and heating and stirring were performed again for 30 minutes.

Thereafter, another 2 mL of 2-normal butoxyethanol was added, and heating and stirring were performed again for 30 minutes.

Heating and stirring for 30 minutes were seen as one round of dehydration treatment, and as such, three rounds of dehydration treatment were performed in this example.

After the dehydration treatment, the reagent bottle was capped and sealed.

Then, stirring was performed with the hot plate set to a temperature of 25° C. and a rotational speed of 500 rpm, and the content of the reagent bottle was gradually cooled to room temperature.

Thereafter, the reagent bottle was transferred to a dry atmosphere, and 0.700 g of the 2-normal butoxyethanol solution of zirconium tetranormal butoxide, 0.250 g of the 2-normal butoxyethanol solution of niobium pentaethoxide, 0.500 g of the 2-normal butoxyethanol solution of antimony trinormal butoxide, and 0.400 g of the 2-normal butoxyethanol solution of tantalum pentaethoxide, all prepared as described above, were weighed and placed into the reagent bottle. A magnetic stir bar was then placed into the reagent bottle.

Stirring was then performed at room temperature for 30 minutes with the magnetic stirrer set at a rotational speed of 500 rpm, resulting in a precursor solution.

Next, the precursor solution was placed in a titanium Petri dish with an inner diameter of 50 mm and a height of 20 mm. The Petri dish containing the precursor solution was placed on the hot plate, and heating was performed for 1 hour with the hot plate set to a temperature of 160° C., followed by heating for 30 minutes with the hot plate set to a temperature of 180° C., thus removing the solvent.

Following that, heating was performed for 30 minutes with the hot plate set to a temperature of 360° C., decomposing most of the organic components contained in the content of the Petri dish by combustion.

Thereafter, heating was performed for 1 hour with the hot plate set to a temperature of 540° C., and the remaining organic components were combusted and decomposed. Then, the content of the Petri dish was gradually cooled to room temperature while the Petri dish was on the hot plate, resulting in a solid composition that is the calcined body.

Example 4

In Example 4, a calcined body used in the production of a solid electrolyte having a composition represented by $Li_{6.8}La_3(Zr_{1.70}In_{0.10}Nb_{0.10}Ta_{0.10})O_{12}$ was produced as follows.

First, 8.160 g of the 2-normal butoxyethanol solution of lithium nitrate prepared as described above, 3.000 g of the 2-normal butoxyethanol solution of lanthanum nitrate hexahydrate prepared as described above, 0.100 g of the aqueous solution of indium nitrate prepared as described above, and 2 mL of 2-normal butoxyethanol as an organic solvent were weighed and placed into a Pyrex reagent bottle. A magnetic stir bar was placed into the reagent bottle, which was then placed on a hot plate with a magnetic stirrer.

The hot plate was set to a temperature of 160° C. and a rotational speed of 500 rpm, and heating and stirring were performed for 30 minutes.

Then, another 2 mL of 2-normal butoxyethanol was added, and heating and stirring were performed again for 30 minutes.

Thereafter, another 2 mL of 2-normal butoxyethanol was added, and heating and stirring were performed again for 30 minutes.

Heating and stirring for 30 minutes were seen as one round of dehydration treatment, and as such, three rounds of dehydration treatment were performed in this example.

After the dehydration treatment, the reagent bottle was capped and sealed.

Then, stirring was performed with the hot plate set to a temperature of 25° C. and a rotational speed of 500 rpm, and the content of the reagent bottle was gradually cooled to room temperature.

Thereafter, the reagent bottle was transferred to a dry atmosphere, and 1.700 g of the 2-normal butoxyethanol solution of zirconium tetranormal butoxide, 0.100 g of the 2-normal butoxyethanol solution of niobium pentaethoxide, and 0.100 g of the 2-normal butoxyethanol solution of tantalum pentaethoxide, all prepared as described above, were weighed and placed into the reagent bottle. A magnetic stir bar was then placed into the reagent bottle.

Stirring was then performed at room temperature for 30 minutes with the magnetic stirrer set at a rotational speed of 500 rpm, resulting in a precursor solution.

Next, the precursor solution was placed in a titanium Petri dish with an inner diameter of 50 mm and a height of 20 mm. The Petri dish containing the precursor solution was placed on the hot plate, and heating was performed for 1 hour with the hot plate set to a temperature of 160° C., followed by heating for 30 minutes with the hot plate set to a temperature of 180° C., thus removing the solvent.

Following that, heating was performed for 30 minutes with the hot plate set to a temperature of 360° C., decomposing most of the organic components contained in the content of the Petri dish by combustion.

Thereafter, heating was performed for 1 hour with the hot plate set to a temperature of 540° C., and the remaining organic components were combusted and decomposed. Then, the content of the Petri dish was gradually cooled to room temperature while the Petri dish was on the hot plate, resulting in a solid composition that is the calcined body.

Example 5

In Example 5, a calcined body used in the production of a solid electrolyte having a composition represented by $Li_{5.6}La_3(Zr_{0.42}In_{0.18}Nb_{0.35}Sb_{0.60}Ta_{0.45})O_{12}$ was produced as follows.

First, 6.720 g of the 2-normal butoxyethanol solution of lithium nitrate prepared as described above, 3.000 g of the 2-normal butoxyethanol solution of lanthanum nitrate hexahydrate prepared as described above, 0.180 g of the aqueous solution of indium nitrate prepared as described above, and 2 mL of 2-normal butoxyethanol as an organic solvent were weighed and placed into a Pyrex reagent bottle. A magnetic stir bar was placed into the reagent bottle, which was then placed on a hot plate with a magnetic stirrer.

The hot plate was set to a temperature of 160° C. and a rotational speed of 500 rpm, and heating and stirring were performed for 30 minutes.

Then, another 2 mL of 2-normal butoxyethanol was added, and heating and stirring were performed again for 30 minutes.

Thereafter, another 2 mL of 2-normal butoxyethanol was added, and heating and stirring were performed again for 30 minutes.

Heating and stirring for 30 minutes were seen as one round of dehydration treatment, and as such, three rounds of dehydration treatment were performed in this example.

After the dehydration treatment, the reagent bottle was capped and sealed.

Then, stirring was performed with the hot plate set to a temperature of 25° C. and a rotational speed of 500 rpm, and the content of the reagent bottle was gradually cooled to room temperature.

Thereafter, the reagent bottle was transferred to a dry atmosphere, and 0.420 g of the 2-normal butoxyethanol solution of zirconium tetranormal butoxide, 0.350 g of the 2-normal butoxyethanol solution of niobium pentaethoxide, 0.600 g of the 2-normal butoxyethanol solution of antimony trinormal butoxide, and 0.450 g of the 2-normal butoxyethanol solution of tantalum pentaethoxide, all prepared as described above, were weighed and placed into the reagent bottle. A magnetic stir bar was then placed into the reagent bottle.

Stirring was then performed at room temperature for 30 minutes with the magnetic stirrer set at a rotational speed of 500 rpm, resulting in a precursor solution.

Next, the precursor solution was placed in a titanium Petri dish with an inner diameter of 50 mm and a height of 20 mm. The Petri dish containing the precursor solution was placed on the hot plate, and heating was performed for 1 hour with the hot plate set to a temperature of 160° C., followed by heating for 30 minutes with the hot plate set to a temperature of 180° C., thus removing the solvent.

Following that, heating was performed for 30 minutes with the hot plate set to a temperature of 360° C., decomposing most of the organic components contained in the content of the Petri dish by combustion.

Thereafter, heating was performed for 1 hour with the hot plate set to a temperature of 540° C., and the remaining organic components were combusted and decomposed. Then, the content of the Petri dish was gradually cooled to room temperature while the Petri dish was on the hot plate, resulting in a solid composition that is the calcined body.

Example 6

In Example 6, a calcined body used in the production of a solid electrolyte having a composition represented by $Li_{6.7}La_3(Zr_{1.55}In_{0.15}Nb_{0.25}Ta_{0.05})O_{12}$ was produced as follows.

First, 8.040 g of the 2-normal butoxyethanol solution of lithium nitrate prepared as described above, 3.000 g of the 2-normal butoxyethanol solution of lanthanum nitrate hexahydrate prepared as described above, 0.150 g of the aqueous solution of indium nitrate prepared as described above, and 2 mL of 2-normal butoxyethanol as an organic solvent were weighed and placed into a Pyrex reagent bottle. A magnetic stir bar was placed into the reagent bottle, which was then placed on a hot plate with a magnetic stirrer.

The hot plate was set to a temperature of 160° C. and a rotational speed of 500 rpm, and heating and stirring were performed for 30 minutes.

Then, another 2 mL of 2-normal butoxyethanol was added, and heating and stirring were performed again for 30 minutes.

Thereafter, another 2 mL of 2-normal butoxyethanol was added, and heating and stirring were performed again for 30 minutes.

Heating and stirring for 30 minutes were seen as one round of dehydration treatment, and as such, three rounds of dehydration treatment were performed in this example.

After the dehydration treatment, the reagent bottle was capped and sealed.

Then, stirring was performed with the hot plate set to a temperature of 25° C. and a rotational speed of 500 rpm, and the content of the reagent bottle was gradually cooled to room temperature.

Thereafter, the reagent bottle was transferred to a dry atmosphere, and 1.550 g of the 2-normal butoxyethanol solution of zirconium tetranormal butoxide, 0.250 g of the 2-normal butoxyethanol solution of niobium pentaethoxide, and 0.050 g of the 2-normal butoxyethanol solution of tantalum pentaethoxide, all prepared as described above, were weighed and placed into the reagent bottle. A magnetic stir bar was then placed into the reagent bottle.

Stirring was then performed at room temperature for 30 minutes with the magnetic stirrer set at a rotational speed of 500 rpm, resulting in a precursor solution.

Next, the precursor solution was placed in a titanium Petri dish with an inner diameter of 50 mm and a height of 20 mm. The Petri dish containing the precursor solution was placed on the hot plate, and heating was performed for 1 hour with the hot plate set to a temperature of 160° C., followed by heating for 30 minutes with the hot plate set to a temperature of 180° C., thus removing the solvent.

Following that, heating was performed for 30 minutes with the hot plate set to a temperature of 360° C., decomposing most of the organic components contained in the content of the Petri dish by combustion.

Thereafter, heating was performed for 1 hour with the hot plate set to a temperature of 540° C., and the remaining organic components were combusted and decomposed. Then, the content of the Petri dish was gradually cooled to room temperature while the Petri dish was on the hot plate, resulting in a solid composition that is the calcined body.

Comparative Example 1

In Comparative Example 1, a calcined body used in the production of a solid electrolyte having a composition represented by $Li_{6.3}La_3(Zr_{1.30}Sb_{0.50}Ta_{0.20})O_{12}$ was produced as follows.

First, 7.560 g of the 2-normal butoxyethanol solution of lithium nitrate prepared as described above, 3.000 g of the 2-normal butoxyethanol solution of lanthanum nitrate hexahydrate prepared as described above, and 2 mL of 2-normal butoxyethanol as an organic solvent were weighed and placed into a Pyrex reagent bottle. A magnetic stir bar was placed into the reagent bottle, which was then placed on a hot plate with a magnetic stirrer.

The hot plate was set to a temperature of 160° C. and a rotational speed of 500 rpm, and heating and stirring were performed for 30 minutes.

Then, another 2 mL of 2-normal butoxyethanol was added, and heating and stirring were performed again for 30 minutes.

Thereafter, another 2 mL of 2-normal butoxyethanol was added, and heating and stirring were performed again for 30 minutes.

Heating and stirring for 30 minutes were seen as one round of dehydration treatment, and as such, three rounds of dehydration treatment were performed in this comparative example.

After the dehydration treatment, the reagent bottle was capped and sealed.

Then, stirring was performed with the hot plate set to a temperature of 25° C. and a rotational speed of 500 rpm, and the content of the reagent bottle was gradually cooled to room temperature.

Thereafter, the reagent bottle was transferred to a dry atmosphere, and 1.300 g of the 2-normal butoxyethanol solution of zirconium tetranormal butoxide, 0.500 g of the 2-normal butoxyethanol solution of antimony trinormal butoxide, and 0.200 g of the 2-normal butoxyethanol solution of tantalum pentaethoxide, all prepared as described above, were weighed and placed into the reagent bottle. A magnetic stir bar was then placed into the reagent bottle.

Stirring was then performed at room temperature for 30 minutes with the magnetic stirrer set at a rotational speed of 500 rpm, resulting in a precursor solution.

Next, the precursor solution was placed in a titanium Petri dish with an inner diameter of 50 mm and a height of 20 mm. The Petri dish containing the precursor solution was placed on the hot plate, and heating was performed for 1 hour with the hot plate set to a temperature of 160° C., followed by heating for 30 minutes with the hot plate set to a temperature of 180° C., thus removing the solvent.

Following that, heating was performed for 30 minutes with the hot plate set to a temperature of 360° C., decomposing most of the organic components contained in the content of the Petri dish by combustion.

Thereafter, heating was performed for 1 hour with the hot plate set to a temperature of 540° C., and the remaining organic components were combusted and decomposed. Then, the content of the Petri dish was gradually cooled to room temperature while the Petri dish was on the hot plate, resulting in a solid composition that is the calcined body.

Comparative Example 2

In Comparative Example 2, a calcined body used in the production of a solid electrolyte having a composition represented by $Li_{6.3}La_3(Zr_{1.10}In_{0.20}Sb_{0.50}Ta_{0.20})O_{12}$ was produced as follows.

First, 7.560 g of the 2-normal butoxyethanol solution of lithium nitrate prepared as described above, 3.000 g of the 2-normal butoxyethanol solution of lanthanum nitrate hexahydrate prepared as described above, 0.200 g of the aqueous solution of indium nitrate prepared as described above, and 2 mL of 2-normal butoxyethanol as an organic solvent were weighed and placed into a Pyrex reagent bottle. A magnetic stir bar was placed into the reagent bottle, which was then placed on a hot plate with a magnetic stirrer.

The hot plate was set to a temperature of 160° C. and a rotational speed of 500 rpm, and heating and stirring were performed for 30 minutes.

Then, another 2 mL of 2-normal butoxyethanol was added, and heating and stirring were performed again for 30 minutes.

Thereafter, another 2 mL of 2-normal butoxyethanol was added, and heating and stirring were performed again for 30 minutes.

Heating and stirring for 30 minutes were seen as one round of dehydration treatment, and as such, three rounds of dehydration treatment were performed in this comparative example.

After the dehydration treatment, the reagent bottle was capped and sealed.

Then, stirring was performed with the hot plate set to a temperature of 25° C. and a rotational speed of 500 rpm, and the content of the reagent bottle was gradually cooled to room temperature.

Thereafter, the reagent bottle was transferred to a dry atmosphere, and 1.100 g of the 2-normal butoxyethanol solution of zirconium tetranormal butoxide, 0.500 g of the 2-normal butoxyethanol solution of antimony trinormal butoxide, and 0.200 g of the 2-normal butoxyethanol solution of tantalum pentaethoxide, all prepared as described above, were weighed and placed into the reagent bottle. A magnetic stir bar was then placed into the reagent bottle.

Stirring was then performed at room temperature for 30 minutes with the magnetic stirrer set at a rotational speed of 500 rpm, resulting in a precursor solution.

Next, the precursor solution was placed in a titanium Petri dish with an inner diameter of 50 mm and a height of 20 mm. The Petri dish containing the precursor solution was placed on the hot plate, and heating was performed for 1 hour with the hot plate set to a temperature of 160° C., followed by heating for 30 minutes with the hot plate set to a temperature of 180° C., thus removing the solvent.

Following that, heating was performed for 30 minutes with the hot plate set to a temperature of 360° C., decomposing most of the organic components contained in the content of the Petri dish by combustion.

Thereafter, heating was performed for 1 hour with the hot plate set to a temperature of 540° C., and the remaining organic components were combusted and decomposed. Then, the content of the Petri dish was gradually cooled to room temperature while the Petri dish was on the hot plate, resulting in a solid composition that is the calcined body.

Comparative Example 3

In Comparative Example 3, a calcined body used in the production of a solid electrolyte having a composition represented by $Li_{6.85}La_3(Zr_{1.77}In_{0.08}Nb_{0.10}Ta_{0.05})O_{12}$ was produced as follows.

First, 8.220 g of the 2-normal butoxyethanol solution of lithium nitrate prepared as described above, 3.000 g of the 2-normal butoxyethanol solution of lanthanum nitrate hexahydrate prepared as described above, 0.080 g of the aqueous solution of indium nitrate prepared as described above, and 2 mL of 2-normal butoxyethanol as an organic solvent were weighed and placed into a Pyrex reagent bottle. A magnetic stir bar was placed into the reagent bottle, which was then placed on a hot plate with a magnetic stirrer.

The hot plate was set to a temperature of 160° C. and a rotational speed of 500 rpm, and heating and stirring were performed for 30 minutes.

Then, another 2 mL of 2-normal butoxyethanol was added, and heating and stirring were performed again for 30 minutes.

Thereafter, another 2 mL of 2-normal butoxyethanol was added, and heating and stirring were performed again for 30 minutes.

Heating and stirring for 30 minutes were seen as one round of dehydration treatment, and as such, three rounds of dehydration treatment were performed in this comparative example.

After the dehydration treatment, the reagent bottle was capped and sealed.

Then, stirring was performed with the hot plate set to a temperature of 25° C. and a rotational speed of 500 rpm, and the content of the reagent bottle was gradually cooled to room temperature.

Thereafter, the reagent bottle was transferred to a dry atmosphere, and 1.770 g of the 2-normal butoxyethanol solution of zirconium tetranormal butoxide, 0.100 g of the 2-normal butoxyethanol solution of niobium pentaethoxide, and 0.050 g of the 2-normal butoxyethanol solution of tantalum pentaethoxide, all prepared as described above, were weighed and placed into the reagent bottle. A magnetic stir bar was then placed into the reagent bottle.

Stirring was then performed at room temperature for 30 minutes with the magnetic stirrer set at a rotational speed of 500 rpm, resulting in a precursor solution.

Next, the precursor solution was placed in a titanium Petri dish with an inner diameter of 50 mm and a height of 20 mm. The Petri dish containing the precursor solution was placed on the hot plate, and heating was performed for 1 hour with the hot plate set to a temperature of 160° C., followed by heating for 30 minutes with the hot plate set to a temperature of 180° C., thus removing the solvent.

Following that, heating was performed for 30 minutes with the hot plate set to a temperature of 360° C., decomposing most of the organic components contained in the content of the Petri dish by combustion.

Thereafter, heating was performed for 1 hour with the hot plate set to a temperature of 540° C., and the remaining organic components were combusted and decomposed. Then, the content of the Petri dish was gradually cooled to room temperature while the Petri dish was on the hot plate, resulting in a solid composition that is the calcined body.

Comparative Example 4

In Comparative Example 4, a calcined body used in the production of a solid electrolyte having a composition represented by $Li_{5.5}La_3(Zr_{0.40}In_{0.10}Nb_{0.45}Sb_{0.65}Ta_{0.40})O_{12}$ was produced as follows.

First, 6.600 g of the 2-normal butoxyethanol solution of lithium nitrate prepared as described above, 3.000 g of the 2-normal butoxyethanol solution of lanthanum nitrate hexahydrate prepared as described above, 0.100 g of the aqueous solution of indium nitrate prepared as described above, and 2 mL of 2-normal butoxyethanol as an organic solvent were weighed and placed into a Pyrex reagent bottle. A magnetic stir bar was placed into the reagent bottle, which was then placed on a hot plate with a magnetic stirrer.

The hot plate was set to a temperature of 160° C. and a rotational speed of 500 rpm, and heating and stirring were performed for 30 minutes.

Then, another 2 mL of 2-normal butoxyethanol was added, and heating and stirring were performed again for 30 minutes.

Thereafter, another 2 mL of 2-normal butoxyethanol was added, and heating and stirring were performed again for 30 minutes.

Heating and stirring for 30 minutes were seen as one round of dehydration treatment, and as such, three rounds of dehydration treatment were performed in this comparative example.

After the dehydration treatment, the reagent bottle was capped and sealed.

Then, stirring was performed with the hot plate set to a temperature of 25° C. and a rotational speed of 500 rpm, and the content of the reagent bottle was gradually cooled to room temperature.

Thereafter, the reagent bottle was transferred to a dry atmosphere, and 0.400 g of the 2-normal butoxyethanol solution of zirconium tetranormal butoxide, 0.450 g of the 2-normal butoxyethanol solution of niobium pentaethoxide, 0.650 g of the 2-normal butoxyethanol solution of antimony trinormal butoxide, and 0.400 g of the 2-normal butoxyethanol solution of tantalum pentaethoxide, all prepared as described above, were weighed and placed into the reagent bottle. A magnetic stir bar was then placed into the reagent bottle.

Stirring was then performed at room temperature for 30 minutes with the magnetic stirrer set at a rotational speed of 500 rpm, resulting in a precursor solution.

Next, the precursor solution was placed in a titanium Petri dish with an inner diameter of 50 mm and a height of 20 mm. The Petri dish containing the precursor solution was placed on the hot plate, and heating was performed for 1 hour with the hot plate set to a temperature of 160° C., followed by heating for 30 minutes with the hot plate set to a temperature of 180° C., thus removing the solvent.

Following that, heating was performed for 30 minutes with the hot plate set to a temperature of 360° C., decomposing most of the organic components contained in the content of the Petri dish by combustion.

Thereafter, heating was performed for 1 hour with the hot plate set to a temperature of 540° C., and the remaining organic components were combusted and decomposed. Then, the content of the Petri dish was gradually cooled to room temperature while the Petri dish was on the hot plate, resulting in a solid composition that is the calcined body.

Comparative Example 5

In Comparative Example 5, a calcined body used in the production of a solid electrolyte having a composition represented by $Li_{6.3}La_3(Zr_{1.15}In_{0.15}Ta_{0.70})O_{12}$ was produced as follows.

First, 7.560 g of the 2-normal butoxyethanol solution of lithium nitrate prepared as described above, 3.000 g of the 2-normal butoxyethanol solution of lanthanum nitrate hexahydrate prepared as described above, 0.150 g of the aqueous solution of indium nitrate prepared as described above, and 2 mL of 2-normal butoxyethanol as an organic solvent were weighed and placed into a Pyrex reagent bottle. A magnetic stir bar was placed into the reagent bottle, which was then placed on a hot plate with a magnetic stirrer.

The hot plate was set to a temperature of 160° C. and a rotational speed of 500 rpm, and heating and stirring were performed for 30 minutes.

Then, another 2 mL of 2-normal butoxyethanol was added, and heating and stirring were performed again for 30 minutes.

Thereafter, another 2 mL of 2-normal butoxyethanol was added, and heating and stirring were performed again for 30 minutes.

Heating and stirring for 30 minutes were seen as one round of dehydration treatment, and as such, three rounds of dehydration treatment were performed in this comparative example.

After the dehydration treatment, the reagent bottle was capped and sealed.

Then, stirring was performed with the hot plate set to a temperature of 25° C. and a rotational speed of 500 rpm, and the content of the reagent bottle was gradually cooled to room temperature.

Thereafter, the reagent bottle was transferred to a dry atmosphere, and 1.150 g of the 2-normal butoxyethanol solution of zirconium tetranormal butoxide and 0.700 g of the 2-normal butoxyethanol solution of tantalum pentaethoxide, both prepared as described above, were weighed and placed into the reagent bottle. A magnetic stir bar was then placed into the reagent bottle.

Stirring was then performed at room temperature for 30 minutes with the magnetic stirrer set at a rotational speed of 500 rpm, resulting in a precursor solution.

Next, the precursor solution was placed in a titanium Petri dish with an inner diameter of 50 mm and a height of 20 mm. The Petri dish containing the precursor solution was placed on the hot plate, and heating was performed for 1 hour with the hot plate set to a temperature of 160° C., followed by heating for 30 minutes with the hot plate set to a temperature of 180° C., thus removing the solvent.

Following that, heating was performed for 30 minutes with the hot plate set to a temperature of 360° C., decomposing most of the organic components contained in the content of the Petri dish by combustion.

Thereafter, heating was performed for 1 hour with the hot plate set to a temperature of 540° C., and the remaining organic components were combusted and decomposed. Then, the content of the Petri dish was gradually cooled to room temperature while the Petri dish was on the hot plate, resulting in a solid composition that is the calcined body.

Comparative Example 6

In Comparative Example 6, a calcined body used in the production of a solid electrolyte having a composition represented by $Li_{6.6}La_3(Zr_{1.42}In_{0.18}Nb_{0.40})O_{12}$ was produced as follows.

First, 7.920 g of the 2-normal butoxyethanol solution of lithium nitrate prepared as described above, 3.000 g of the 2-normal butoxyethanol solution of lanthanum nitrate hexahydrate prepared as described above, 0.180 g of the aqueous solution of indium nitrate prepared as described above, and 2 mL of 2-normal butoxyethanol as an organic solvent were weighed and placed into a Pyrex reagent bottle. A magnetic stir bar was placed into the reagent bottle, which was then placed on a hot plate with a magnetic stirrer.

The hot plate was set to a temperature of 160° C. and a rotational speed of 500 rpm, and heating and stirring were performed for 30 minutes.

Then, another 2 mL of 2-normal butoxyethanol was added, and heating and stirring were performed again for 30 minutes.

Thereafter, another 2 mL of 2-normal butoxyethanol was added, and heating and stirring were performed again for 30 minutes.

Heating and stirring for 30 minutes were seen as one round of dehydration treatment, and as such, three rounds of dehydration treatment were performed in this comparative example.

After the dehydration treatment, the reagent bottle was capped and sealed.

Then, stirring was performed with the hot plate set to a temperature of 25° C. and a rotational speed of 500 rpm, and the content of the reagent bottle was gradually cooled to room temperature.

Thereafter, the reagent bottle was transferred to a dry atmosphere, and 1.420 g of the 2-normal butoxyethanol solution of zirconium tetranormal butoxide and 0.400 g of the 2-normal butoxyethanol solution of niobium pentaethoxide, both prepared as described above, were weighed and placed into the reagent bottle. A magnetic stir bar was then placed into the reagent bottle.

Stirring was then performed at room temperature for 30 minutes with the magnetic stirrer set at a rotational speed of 500 rpm, resulting in a precursor solution.

Next, the precursor solution was placed in a titanium Petri dish with an inner diameter of 50 mm and a height of 20 mm. The Petri dish containing the precursor solution was placed on the hot plate, and heating was performed for 1 hour with the hot plate set to a temperature of 160° C., followed by heating for 30 minutes with the hot plate set to a temperature of 180° C., thus removing the solvent.

Following that, heating was performed for 30 minutes with the hot plate set to a temperature of 360° C., decomposing most of the organic components contained in the content of the Petri dish by combustion.

Thereafter, heating was performed for 1 hour with the hot plate set to a temperature of 540° C., and the remaining organic components were combusted and decomposed. Then, the content of the Petri dish was gradually cooled to room temperature while the Petri dish was on the hot plate, resulting in a solid composition that is the calcined body.

Comparative Example 7

In Comparative Example 7, a calcined body used in the production of a solid electrolyte having a composition represented by $Li_{6.7}La_3(Zr_{1.58}In_{0.12}Sb_{0.30})O_{12}$ was produced as follows.

First, 8.040 g of the 2-normal butoxyethanol solution of lithium nitrate prepared as described above, 3.000 g of the 2-normal butoxyethanol solution of lanthanum nitrate hexahydrate prepared as described above, 0.120 g of the aqueous solution of indium nitrate prepared as described above, and 2 mL of 2-normal butoxyethanol as an organic solvent were weighed and placed into a Pyrex reagent bottle. A magnetic stir bar was placed into the reagent bottle, which was then placed on a hot plate with a magnetic stirrer.

The hot plate was set to a temperature of 160° C. and a rotational speed of 500 rpm, and heating and stirring were performed for 30 minutes.

Then, another 2 mL of 2-normal butoxyethanol was added, and heating and stirring were performed again for 30 minutes.

Thereafter, another 2 mL of 2-normal butoxyethanol was added, and heating and stirring were performed again for 30 minutes.

Heating and stirring for 30 minutes were seen as one round of dehydration treatment, and as such, three rounds of dehydration treatment were performed in this comparative example.

After the dehydration treatment, the reagent bottle was capped and sealed.

Then, stirring was performed with the hot plate set to a temperature of 25° C. and a rotational speed of 500 rpm, and the content of the reagent bottle was gradually cooled to room temperature.

Thereafter, the reagent bottle was transferred to a dry atmosphere, and 1.580 g of the 2-normal butoxyethanol solution of zirconium tetranormal butoxide and 0.300 g of the 2-normal butoxyethanol solution of antimony trinormal butoxide, both prepared as described above, were weighed and placed into the reagent bottle. A magnetic stir bar was then placed into the reagent bottle.

Stirring was then performed at room temperature for 30 minutes with the magnetic stirrer set at a rotational speed of 500 rpm, resulting in a precursor solution.

Next, the precursor solution was placed in a titanium Petri dish with an inner diameter of 50 mm and a height of 20 mm. The Petri dish containing the precursor solution was placed on the hot plate, and heating was performed for 1 hour with the hot plate set to a temperature of 160° C., followed by heating for 30 minutes with the hot plate set to a temperature of 180° C., thus removing the solvent.

Following that, heating was performed for 30 minutes with the hot plate set to a temperature of 360° C., decomposing most of the organic components contained in the content of the Petri dish by combustion.

Thereafter, heating was performed for 1 hour with the hot plate set to a temperature of 540° C., and the remaining organic components were combusted and decomposed.

Then, the content of the Petri dish was gradually cooled to room temperature while the Petri dish was on the hot plate, resulting in a solid composition that is the calcined body.

6-3 Production of Solid Electrolyte

Using the calcined bodys of each of the examples and the comparative examples obtained as described above, corresponding solid electrolytes were respectively produced as follows.

First, each of the calcined bodys were transferred to an agate mortar and thoroughly crushed. 0.150 g of the crushed product of the calcined body obtained in this manner was weighed and charged into a pellet die serving as a mold, the pellet die having an inner diameter of 10 mm and an exhaust port. A pressure of 0.624 kN/mm$^2$ was applied for 5 minutes to produce a pellet of calcined body that is a disk-shaped molded product.

Furthermore, the pellet of calcined body was placed in a crucible made of magnesium oxide, covered with a lid made of magnesium oxide, and subjected to firing in an electric muffle furnace FP311 available from Yamato Scientific Co., Ltd. The firing conditions were 900° C. for 8 hours. Next, the electric muffle furnace was gradually cooled to room temperature, and the disk-shaped solid electrolyte with a diameter of approximately 9.5 mm and a thickness of approximately 600 μm was removed from the crucible.

The compositions and crystal phases of the solid electrolyte of each of the examples and the comparative examples are summarized in Table 1. The crystal phase of each of the solid electrolytes was determined from an X-ray diffraction pattern measured using an X-ray diffraction apparatus X'Pert-PRO available from Philips. In Table 1, a cubic crystal structure was indicated as "c". Note that the content of the oxoacid compound in the solid electrolyte of each of the examples and the comparative examples described above was 10 ppm or less. In addition, the calcined body of each of the examples and the comparative examples described above had a solvent content of 0.1 mass % or less. Furthermore, when a portion of the calcined body of each of the examples was subjected to a TG-DTA at a heating rate of 10° C./minute, only one exothermic peak was observed in the range of from 300° C. to 1000° C. From this, it can be said that the calcined body of each of the examples is substantially composed of a single crystalline phase.

TABLE 1

| | Value of x in Formula (1) | Value of y in Formula (1) | Composition of Solid Electrolyte | Crystal Phase |
|---|---|---|---|---|
| EXAMPLE 1 | 0.05 | 0.70 | $Li_{6.3}La_3(Zr_{1.25}In_{0.05}Sb_{0.50}Ta_{0.20})O_{12}$ | c |
| EXAMPLE 2 | 0.15 | 0.70 | $Li_{6.3}La_3(Zr_{1.15}In_{0.15}Sb_{0.50}Ta_{0.20})O_{12}$ | c |
| EXAMPLE 3 | 0.15 | 1.15 | $Li_{5.85}La_3(Zr_{0.70}In_{0.15}Nb_{0.25}Sb_{0.50}Ta_{0.40})O_{12}$ | c |
| EXAMPLE 4 | 0.10 | 0.20 | $Li_{6.8}La_3(Zr_{1.70}In_{0.10}Nb_{0.10}Ta_{0.10})O_{12}$ | c |
| EXAMPLE 5 | 0.18 | 1.40 | $Li_{5.6}La_3(Zr_{0.42}In_{0.18}Nb_{0.35}Sb_{0.60}Ta_{0.45})O_{12}$ | c |
| EXAMPLE 6 | 0.15 | 0.30 | $Li_{6.7}La_3(Zr_{1.55}In_{0.15}Nb_{0.25}Ta_{0.05})O_{12}$ | c |
| COMPARATIVE EXAMPLE 1 | 0.00 | 0.70 | $Li_{6.3}La_3(Zr_{1.30}Sb_{0.50}Ta_{0.20})O_{12}$ | c |
| COMPARATIVE EXAMPLE 2 | 0.20 | 0.70 | $Li_{6.3}La_3(Zr_{1.10}In_{0.20}Sb_{0.50}Ta_{0.20})O_{12}$ | c |
| COMPARATIVE EXAMPLE 3 | 0.08 | 0.15 | $Li_{6.85}La_3(Zr_{1.77}In_{0.08}Nb_{0.10}Ta_{0.05})O_{12}$ | c |
| COMPARATIVE EXAMPLE 4 | 0.10 | 1.50 | $Li_{5.5}La_3(Zr_{0.40}In_{0.10}Nb_{0.45}Sb_{0.65}Ta_{0.40})O_{12}$ | c |
| COMPARATIVE EXAMPLE 5 | 0.15 | 0.70 | $Li_{6.3}La_3(Zr_{1.15}In_{0.15}Ta_{0.70})O_{12}$ | c |
| COMPARATIVE EXAMPLE 6 | 0.18 | 0.40 | $Li_{6.6}La_3(Zr_{1.42}In_{0.18}Nb_{0.40})O_{12}$ | c |
| COMPARATIVE EXAMPLE 7 | 0.12 | 0.30 | $Li_{6.7}La_3(Zr_{1.58}In_{0.12}Sb_{0.30})O_{12}$ | c |

6-4 Evaluation of Solid Electrolytes 6-4-1 Evaluation of Total Lithium Ion Conductivity A round metal lithium foil with a diameter of 5 mm was pressed on each of the two sides of the disk-shaped solid electrolyte of each of the examples and the comparative examples to form an activation electrode.

The total lithium ion conductivity of each of the solid electrolytes was then determined by measuring the electrochemical impedance using an AC impedance analyzer Solartron 1260 (available from Solartron Analytical).

Electrochemical impedance measurements were performed at an AC amplitude of 10 mV and in a frequency domain of from $10^7$ Hz to $10^{-1}$ Hz. The total lithium ion conductivity of each of the solid electrolytes obtained by electrochemical impedance measurement includes the bulk lithium ion conductivity and the grain boundary lithium ion conductivity in the solid electrolyte.

These results are summarized in Table 2.

TABLE 2

| | Total Lithium Ion Conductivity |
|---|---|
| EXAMPLE 1 | $1.1 \times 10^{-3}$ |
| EXAMPLE 2 | $8.7 \times 10^{-4}$ |
| EXAMPLE 3 | $1.1 \times 10^{-3}$ |
| EXAMPLE 4 | $9.5 \times 10^{-4}$ |
| EXAMPLE 5 | $8.2 \times 10^{-4}$ |
| EXAMPLE 6 | $9.0 \times 10^{-4}$ |
| COMPARATIVE EXAMPLE 1 | $7.0 \times 10^{-4}$ |
| COMPARATIVE EXAMPLE 2 | $7.0 \times 10^{-4}$ |
| COMPARATIVE EXAMPLE 3 | $1.0 \times 10^{-4}$ |
| COMPARATIVE EXAMPLE 4 | $8.0 \times 10^{-5}$ |
| COMPARATIVE | $1.0 \times 10^{-4}$ |

TABLE 2-continued

| | Total Lithium Ion Conductivity |
|---|---|
| EXAMPLE 5 | |
| COMPARATIVE EXAMPLE 6 | $9.5 \times 10^{-5}$ |
| COMPARATIVE EXAMPLE 7 | $1.2 \times 10^{-4}$ |

As evident in Table 2, each of the examples containing In and the aforementioned M in a predetermined ratio had excellent lithium ion conductivity. In comparison, Comparative Example 1, which did not include In, Comparative Example 2, in which the content of In was too high, Comparative Example 3, in which the content of the aforementioned M was too low, Comparative Example 4, in which the content of the aforementioned M was too high, and Comparative Examples 5 to 7, which included only one element of Nb, Ta, and Sb but not the other two, all had inferior lithium ion conductivity.

6-4-2 Evaluation of Potential Window

To the disk-shaped solid electrolyte of each of the examples, a lithium metal foil was applied to one surface and a copper foil was applied to the other surface, resulting in an electrochemical measurement cell. CV measurements were performed using an electrochemical instrument AUTOLAB (available from Metrohm Autolab B.V.). The reference electrode and the counter electrode were connected to the lithium metal foil, and the working electrode was connected to the copper foil. The response current was measured by potential sweeping at a rate of 0.04 V/sec in a range of from −1 to 5 V, assuming that the potential of the lithium metal (−3.06 V vs.SHE) was 0 V.

Figure 20:
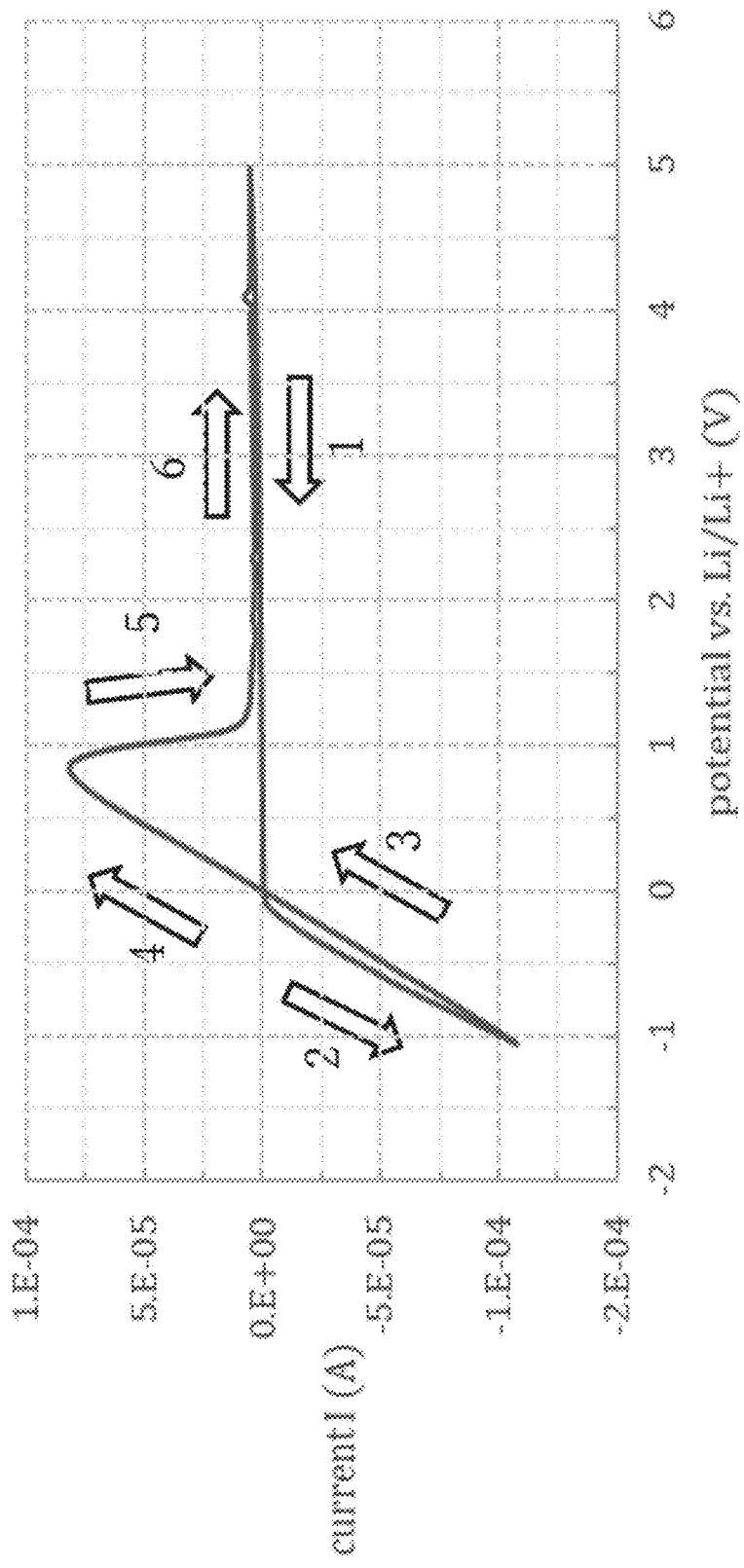
FIG. 20 is a diagram schematically illustrating a sweep potential-response current curve obtained by CV measurement.

CV measurements were performed, and a sweep potential-response current curve at the second cycle, in which the lithium ion concentration distribution was equilibrated, was plotted as in FIG. 20. As a result of the measurement, two peaks were observed in the oxidation-reduction response current, with one considered to be corresponding to the reduction current in which lithium ions are reduced and precipitated as lithium metal when the potential sweep direction was from 0 to −1 V while the other considered to be corresponding to the oxidation current associated with ionization of lithium metal when the potential sweep direction was from 0 to 1 V. Although deviations were seen in each of the currents from the potential of 0 V, it is hypothesized that this was due to overvoltage or ohmic drop such as activation energy associated with the oxidation-reduction reaction or interfacial resistance with the electrodes.

Meanwhile, a response current other than the oxidation-reduction response current of lithium metal did not meet the detection limit in the range of from −1 to 5 V. As such, the solid electrolyte of each of the examples is considered to be a stable solid electrolyte that conducts only lithium ions in a range of from 0 to 4 V (vs. SHE), which is the operating potential range of the battery.

Note that in the CV curve illustrated in FIG. 20, the peak near the area from number 2 to number 3 is considered to represent the reduction-precipitation current that results in lithium ions becoming lithium metal, while the peak near the area from number 4 to number 5 is considered to represent the oxidation-dissolution current that ionizes and dissolves lithium metal. A peak current attributed to the oxidation-reduction response current of the crystalline component of the solid electrolyte of each of the examples was observed.

Note that battery operation does not practically happen at a potential at which lithium ions transforms into lithium metal or the other way around.

7 Production of Solid Electrolyte-coated Cathode Active Material Powder

Example 7

A precursor solution, prepared in the same manner as described in Example 1, and LiCoO$_2$ particles, to be used as a cathode active material for a lithium ion secondary battery, were prepared and mixed at a predetermined proportion. Then, ultrasonic dispersion was performed using an ultrasonic cleaner with temperature control, model US-1 available from As One Corporation, for 2 hours at 55° C., an oscillation frequency of 38 kHz, and an output of 80 W.

Thereafter, centrifugation was performed for 3 minutes at 10000 rpm in a centrifuge, and the supernatant was removed.

The obtained precipitate was transferred to a crucible made of magnesium oxide, covered with a lid, and, using an atmosphere-controlled furnace while supplying dry air at a flow rate of 1 L/min, fired first for 30 minutes at 360° C., then for 1 hour at 540° C., and then for 3 hours at 900° C., followed by cooling to room temperature. This resulted in a solid electrolyte-coated cathode active material powder including multiple constituent particles in which a LiCoO$_2$ particle, which was a host particle, was coated with a coating layer, which was composed of a garnet-type solid electrolyte represented by Li$_{6.3}$La$_3$(Zr$_{1.25}$In$_{0.05}$Sb$_{0.50}$Ta$_{0.20}$)O$_{12}$.

Examples 8 and 9

A solid electrolyte-coated cathode active material powder was produced in the same manner as in Example 7 with the exception that the thickness of the coating layer was changed by adjusting the mixing ratio of the precursor solution and the LiCoO$_2$ particles.

Example 10

A solid electrolyte-coated cathode active material powder was produced in the same manner as in Example 7 with the exceptions that LiNi$_{0.5}$Co$_{0.2}$Mn$_{0.3}$O$_2$ particles were used in place of the LiCoO$_2$ particles as the cathode active material for a lithium ion secondary battery and that the mixing ratio of the precursor solution and the LiNi$_{0.5}$Co$_{0.2}$Mn$_{0.3}$O$_2$ particles was adjusted.

Comparative Example 8

In Comparative Example 10, the aggregate LiCoO$_2$ particles was directly used as the cathode active material powder without a coating layer formed at the LiCoO$_2$ particles that is the cathode active material for a lithium ion secondary battery. In other words, instead of a solid electrolyte-coated cathode active material powder, a cathode active material powder that was not coated with a solid electrolyte was prepared.

Comparative Example 9

A solid electrolyte-coated cathode active material powder was prepared by forming a 3.0 nm-thick coating layer composed of LiNbO$_3$, which is a solid electrolyte, on the surface of $LiCoO_2$ particles, serving as the cathode active material for a lithium ion secondary battery, using a sputtering device.

Comparative Example 10

In Comparative Example 12, the aggregate $LiNi_{0.5}Co_{0.2}Mn_{0.3}O_2$ particles was directly used as the cathode active material powder without a coating layer formed at the $LiNi_{0.5}Co_{0.2}Mn_{0.3}O_2$ particles that is the cathode active material for a lithium ion secondary battery. In other words, instead of a solid electrolyte-coated cathode active material powder, a cathode active material powder that was not coated with a solid electrolyte was prepared.

Each of the solid electrolyte-coated cathode active material powders, according to Examples 7 to 10 and Comparative Example 9, as well as the cathode active material powders, according to Comparative Examples 8 and 10, obtained as described above had a solvent content of 0.1 mass % or less and an oxo anion content of 100 ppm or less. Furthermore, from a reflection electron image obtained by measuring using a field emission scanning electron microscope with EDS (available from JEOL Ltd.), nothing was observed on the surface of the cathode active material powders without a coating layer.

Meanwhile, white contrast was observed on the surface of the constituent particles of the solid electrolyte-coated cathode active material powders in which a coating layer of $Li_{6.3}La_3(Zr_{1.25}In_{0.05}Sb_{0.50}Ta_{0.20})O_{12}$ was formed at the surface of the $LiCoO_2$ particles. The white contrast increased as the concentration increased. This white contrast is considered to be $Li_{6.3}La_3(Zr_{1.25}In_{0.05}Sb_{0.50}Ta_{0.20})O_{12}$ generated by the precursor. Since only diffraction lines attributed to $LiCoO_2$ were confirmed for each of the powders using the X-ray diffraction apparatus, it is considered that the thinner the film thickness of the coating layer is, the lower the diffraction intensity from $Li_{6.3}La_3(Zr_{1.25}In_{0.05}Sb_{0.50}Ta_{0.20})O_{12}$ is below the lower detection limit. According to the field emission scanning electron microscope with EDS (available from JEOL Ltd.), In, Ta, and Sb with a thin coating layer and a low content were not detected, but La and Zr were detected from the surface of the $LiCoO_2$ particles. The composition ratio of La to Zr in $Li_{6.3}La_3(Zr_{1.25}In_{0.05}Sb_{0.50}Ta_{0.20})O_{12}$ is 3:1.25. Meanwhile, the ratio of the content of La to the content of Zr detected by this measurement was, in terms of molar ratio, 2.95:1.19. Since the two ratios are almost the same, it is considered that $Li_{6.3}La_3(Zr_{1.25}In_{0.05}Sb_{0.50}Ta_{0.20})O_{12}$ was generated. Furthermore, when the coating layer after the first heating step in the process of producing the solid electrolyte-coated cathode active material powder of each of Examples 7 to 10 was subjected to a TG-DTA at a heating rate of 10° C./minute, only one exothermic peak was observed in the range of from 300° C. to 1000° C. From this, it can be said that the coating layer after the first heating step in the aforementioned Examples 7 to 10 is substantially formed of a single crystalline phase. In Examples 7 to 10, the coating layer of the constituent particles of the solid electrolyte-coated cathode active material powders finally obtained was composed of a solid electrolyte having a garnet-type crystal phase. Meanwhile, the precursor oxide constituting the coating layer after the first heating step had a pyrochlore type crystal. In addition, in any one of Examples 7 to 10, the content of the liquid component contained in the composition after the first heating step was 0.1 mass % or less. Furthermore, in any one of Example 7 to 10, the crystal grain size of the oxide contained in the coating layer after the first heating step was from 20 nm to 160 nm.

The configurations of the solid electrolyte-coated cathode active material powders according to Examples 7 to 10 and Comparative Example 9 as well as the cathode active material powders according to Comparative Examples 8 and 10 are summarized in Table 3.

TABLE 3

| | Base Particle | | Coating Layer | | | |
|---|---|---|---|---|---|---|
| | Composition | Average Particle Size D[μm] | Composition | Crystal Phase | Thickness T[nm] | T/D |
| Example 7 | $LiCoO_2$ | 7.0 | $Li_{6.3}La_3(Zr_{1.25}In_{0.05}Sb_{0.50}Ta_{0.20})O_{12}$ | Garnet-type | 4.9 | 0.0007 |
| Example 8 | $LiCoO_2$ | 7.0 | $Li_{6.3}La_3(Zr_{1.25}In_{0.05}Sb_{0.50}Ta_{0.20})O_{12}$ | Garnet-type | 23.1 | 0.0033 |
| Example 9 | $LiCoO_2$ | 7.0 | $Li_{6.3}La_3(Zr_{1.25}In_{0.05}Sb_{0.50}Ta_{0.20})O_{12}$ | Garnet-type | 35.5 | 0.0051 |
| Example 10 | $LiNi_{0.5}Co_{0.2}Mn_{0.3}O_2$ | 7.0 | $Li_{6.3}La_3(Zr_{1.25}In_{0.05}Sb_{0.50}Ta_{0.20})O_{12}$ | Garnet-type | 29.7 | 0.0042 |
| Comparative Example 8 | $LiCoO_2$ | 7.0 | — | — | — | — |
| Comparative Example 9 | $LiCoO_2$ | 7.0 | $LiNbO_3$ | Trigonal crystal system | 3.0 | 0.0004 |
| Comparative Example 10 | $LiNi_{0.5}Co_{0.2}Mn_{0.3}O_2$ | 7.0 | — | — | — | — |

8 Evaluation of Solid Electrolyte-Coated Cathode Active Material Powder

Using the solid electrolyte-coated cathode active material powders of Examples 7 to 10 and Comparative Example 9 obtained as described above, corresponding electrical measurement cells were respectively produced as follows. Although the following description is for a case in which one of the solid electrolyte-coated cathode active material powders was used, electrical measurement cells were produced in the same manner for Comparative Examples 8 and 10 with the exception that the cathode active material powder was used in place of the solid electrolyte-coated cathode active material powder.

First, a solid electrolyte-coated cathode active material powder was powder mixed with an acetylene black (DENKA BLACK, available from Denka Company Limited), the acetylene black serving as a conductivity aid. Then, a 10 mass % n-methylpyrrolidinone solution of polyvinylidene difluoride (available from Sigma-Aldrich Japan K.K.) was added to the mixture, resulting in a slurry. The content ratio of the solid electrolyte-coated cathode active material powder, acetylene black, and polyvinylidene difluoride in the obtained slurry was 90:5:5 in terms of mass ratio.

Next, the slurry was applied to an aluminum foil and dried under vacuum to form a cathode.

The formed cathode was punched into a disk shape with a diameter of 13 mm and overlaid on a Celgard #2400 (available from Asahi Kasei Corporation) serving as a separator. An organic electrolyte solution containing $LiPF_6$ as a solute as well as ethylene carbonate and diethylene carbonate as non-aqueous solvents was injected. A lithium metal foil available from Honjo Metal Co., Ltd. was used as the anode. Then, the cathode, the separator, and the anode were packaged in a CR2032 type coin cell, resulting in an electrical measurement cell. LBG-96533 available from Kishida Chemical Co., Ltd. was used as the organic electrolyte solution.

Thereafter, the obtained electrical measurement cells were connected to a battery charge and discharge evaluation system HJ1001SD8, available from Hokuto Denko Corporation, and were subjected to CCV charge and CC discharge as follows: 0.2 C: 8 times; 0.5 C: 5 times; 1 C: 5 times; 2 C: 5 times; 3 C: 5 times; 5 C: 5 times; 8 C: 5 times; 10 C: 5 times; 16 C: 5 times; and 0.2 C: 5 times. After repeating a cycle at the same C rate, the charge and discharge properties were evaluated by increasing the C rate. The charging and discharging current at this time were set by calculation based on the weight of the cathode active material of each cell, an actual capacity of 137 mAh/g of $LiCoO_2$, and 160 mAh/g of NCM523.

The values of discharge capacity at the fifth cycle of the 16 C discharge are summarized in Table 4. It can be said that the larger this value is, the better the charge and discharge performance under a high load is.

TABLE 4

| | Discharge Capacity at Fifth Cycle of 16 C Discharge [mAh/g] |
|---|---|
| EXAMPLE 7 | 110 |
| EXAMPLE 8 | 108 |
| EXAMPLE 9 | 100 |
| EXAMPLE 10 | 41 |
| COMPARATIVE EXAMPLE 8 | 58 |
| COMPARATIVE EXAMPLE 9 | 75 (however, reduced capacity at the low load side) |
| COMPARATIVE EXAMPLE 10 | 20 |

As evident in Table 4, the present disclosure yielded excellent results. In contrast, the comparative examples did not yield satisfactory results. More specifically, when comparing Examples 7 to 9 with Comparative Examples 8 and 9, all used $LiCoO_2$ particles as the cathode active material for a lithium ion secondary battery, Examples 7 to 9 clearly yielded better results than Comparative Examples 8 and 9. Meanwhile, when comparing Example 10 with Comparative Example 10, both used $LiNi_{0.5}Co_{0.2}Mn_{0.3}O_2$ particles as the cathode active material for a lithium ion secondary battery, Example 10 clearly yielded better results than Comparative Example 10.

In addition, solid electrolyte-coated cathode active material powders were produced in the same manner as described in Examples 7 to 10 with the exception that precursor solutions prepared in the same manner as described in Examples 2 to 6 were used instead of a precursor solution prepared in the same manner as described in Example 1. These solid electrolyte-coated cathode active material powders were subjected to the same evaluation as described in [8] above, and the same results as those of Examples 7 to 10 were obtained.

What is claimed is:

1. A solid electrolyte represented by the following formula (1):

$$Li_{7-x}La_3(Zr_{2-x-y}In_xM_y)O_{12} \qquad (1)$$

wherein $0.00<x<0.20$, $0.20\leq y<1.50$, M is two or more elements selected from the group consisting of Nb, Ta, and Sb.

2. A method for producing a solid electrolyte comprising:
a mixing step for mixing a plurality of raw materials to obtain a mixture, the plurality of raw materials including a metal element included in the following formula (1),
a first heating step for subjecting the mixture to a first heat treatment to form a calcined body,
and a second heating step for subjecting the calcined body to a second heat treatment to form a crystalline solid electrolyte represented by the following formula (1):

$$Li_{7-x}La_3(Zr_{2-x-y}In_xM_y)O_{12} \qquad (1)$$

wherein $0.00<x<0.20$, $0.20\leq y<1.50$, M is two or more elements selected from the group consisting of Nb, Ta, and Sb.

3. The method for producing a solid electrolyte according to claim 2, wherein a heating temperature in the first heating step is from 500° C. to 650° C.

4. The method for producing a solid electrolyte according to claim 2, wherein a heating temperature in the second heating step is from 800° C. to 1000° C.

5. A composite comprising:
an active material,
and the solid electrolyte according to claim 1 covering a portion of a surface of the active material.

* * * * *